(12) United States Patent
Jackson et al.

(10) Patent No.: US 11,962,868 B2
(45) Date of Patent: Apr. 16, 2024

(54) DETECTING A QUALITY ISSUE ASSOCIATED WITH A VIDEO STREAM DELIVERY

(71) Applicant: Verizon Patent and Licensing Inc., Basking Ridge, NJ (US)

(72) Inventors: Alva Jackson, Stewartsville, NJ (US); Joseph Fragale, Ho Ho Kus, NJ (US); Sanjay Kohli, Cranbury, NJ (US); Woo Beum Lee, Edgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/106,492

(22) Filed: Nov. 30, 2020

(65) Prior Publication Data

US 2022/0174370 A1  Jun. 2, 2022

(51) Int. Cl.
*H04N 21/6375* (2011.01)
*H04N 21/433* (2011.01)
*H04N 21/4363* (2011.01)
*H04N 21/44* (2011.01)
*H04N 21/442* (2011.01)

(52) U.S. Cl.
CPC ..... *H04N 21/6375* (2013.01); *H04N 21/4331* (2013.01); *H04N 21/4363* (2013.01); *H04N 21/44008* (2013.01); *H04N 21/44016* (2013.01); *H04N 21/442* (2013.01)

(58) Field of Classification Search
CPC .......... H04N 21/6375; H04N 21/4331; H04N 21/4363; H04N 21/44008; H04N 21/44016; H04N 21/442
See application file for complete search history.

(56) References Cited

U.S. PATENT DOCUMENTS

| | | | |
|---|---|---|---|
| 9,210,646 B2* | 12/2015 | Ruffini | H04L 45/22 |
| 10,310,928 B1* | 6/2019 | Hegar | G06F 3/0635 |
| 10,708,331 B1* | 7/2020 | Joliveau | H04L 65/613 |
| 2008/0151881 A1* | 6/2008 | Liu | H04N 21/64322 370/389 |
| 2009/0150960 A1* | 6/2009 | Pickens | H04N 21/658 725/118 |
| 2011/0225454 A1* | 9/2011 | Fan | H04N 21/4334 714/15 |
| 2015/0281306 A1* | 10/2015 | Barak | H04N 21/6582 725/93 |
| 2018/0234714 A1* | 8/2018 | Johns | G06F 16/172 |

(Continued)

*Primary Examiner* — Kyu Chae

(57) ABSTRACT

One or more computing devices, systems, and/or methods for delivering video streams are provided. In an example, a first video stream chunk of a video stream is received. The first video stream chunk is transmitted to a first client device in response to a determination that the first video stream chunk is not associated with a quality issue. A second video stream chunk of the video stream is received. The second video stream chunk is analyzed to determine whether the second video stream chunk is associated with one or more quality issues. A first quality issue associated with the second video stream chunk is detected. A request for a corrective video stream chunk is transmitted to a cache node based upon the first quality issue. The corrective video stream chunk is received from the cache node. The corrective video stream chunk is transmitted to the first client device.

20 Claims, 13 Drawing Sheets

(56) References Cited

U.S. PATENT DOCUMENTS

| | | | |
|---|---|---|---|
| 2018/0351868 A1* | 12/2018 | Cartwright | H04N 21/4621 |
| 2019/0349630 A1* | 11/2019 | Stockhammer | H04L 65/612 |
| 2020/0067629 A1* | 2/2020 | Xiong | H04N 21/24 |
| 2020/0099981 A1* | 3/2020 | Zhang | H04N 21/442 |
| 2021/0329351 A1* | 10/2021 | Giladi | H04N 21/8456 |
| 2022/0038789 A1* | 2/2022 | Giladi | H04L 65/65 |

\* cited by examiner

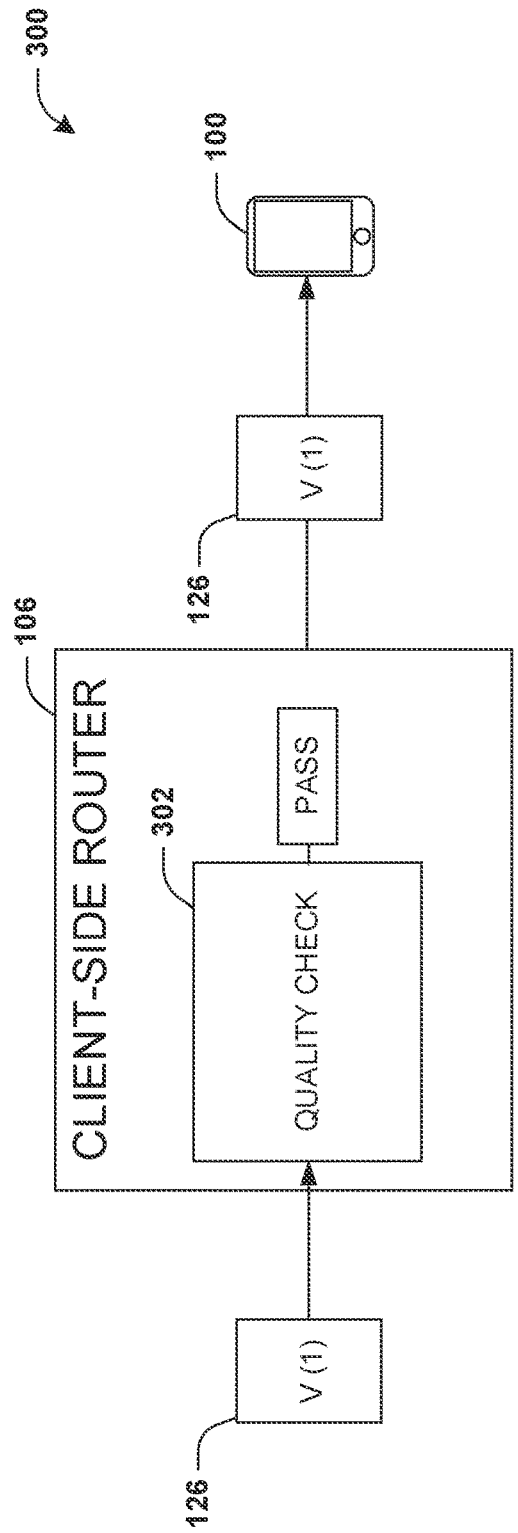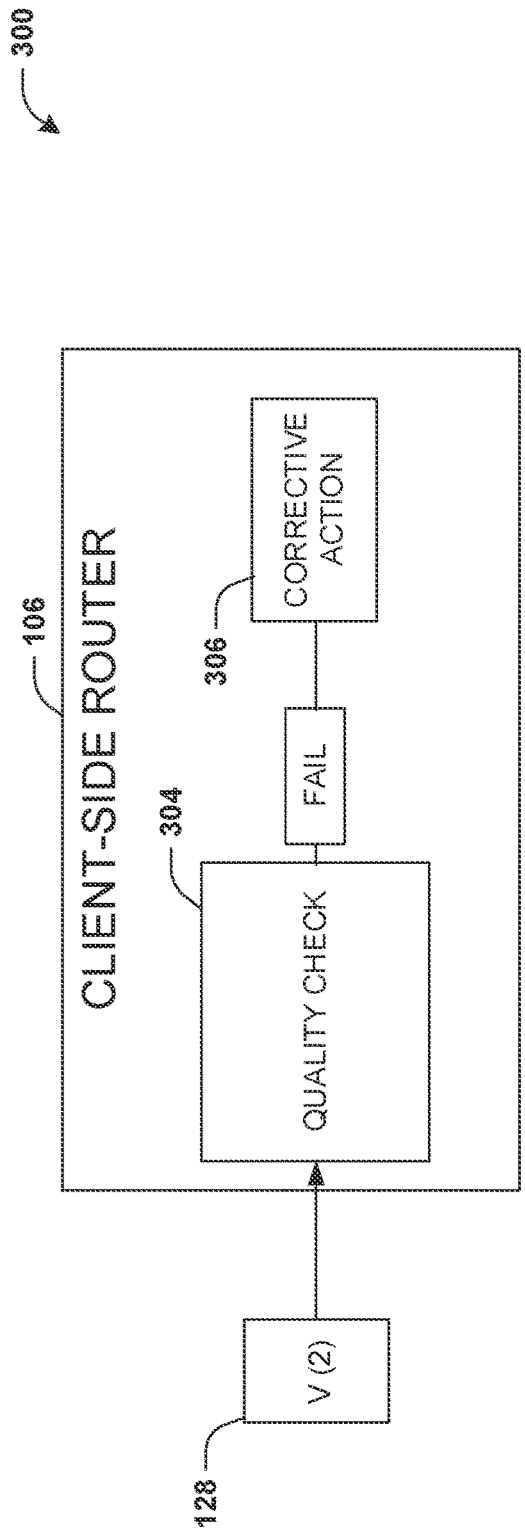

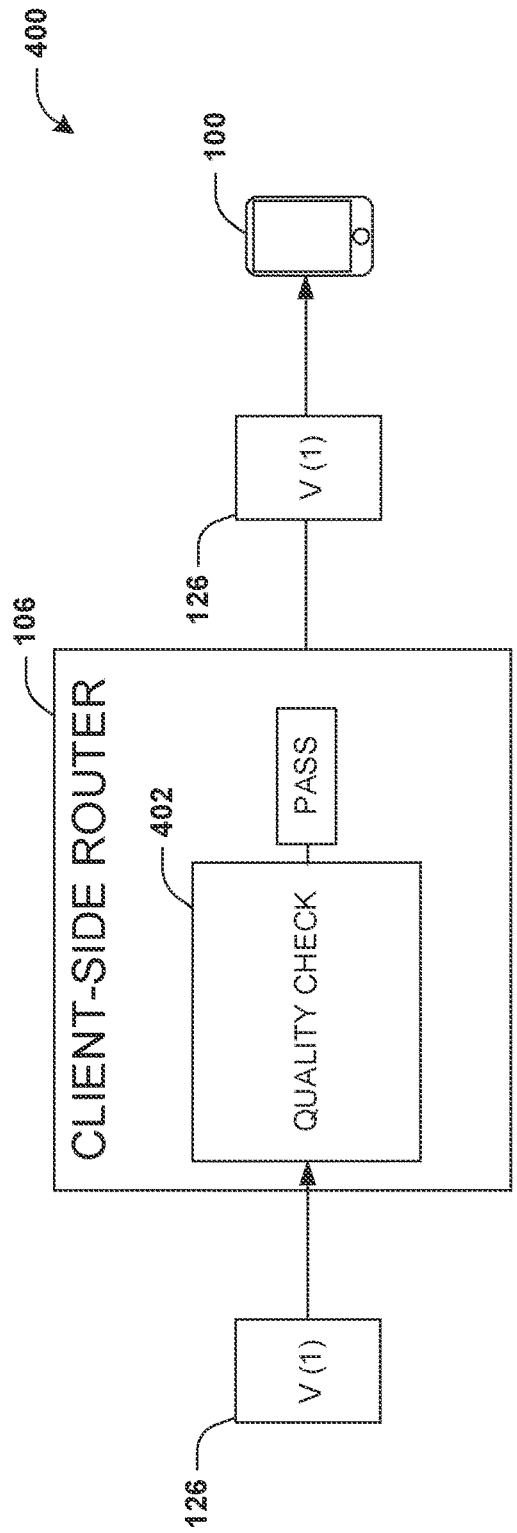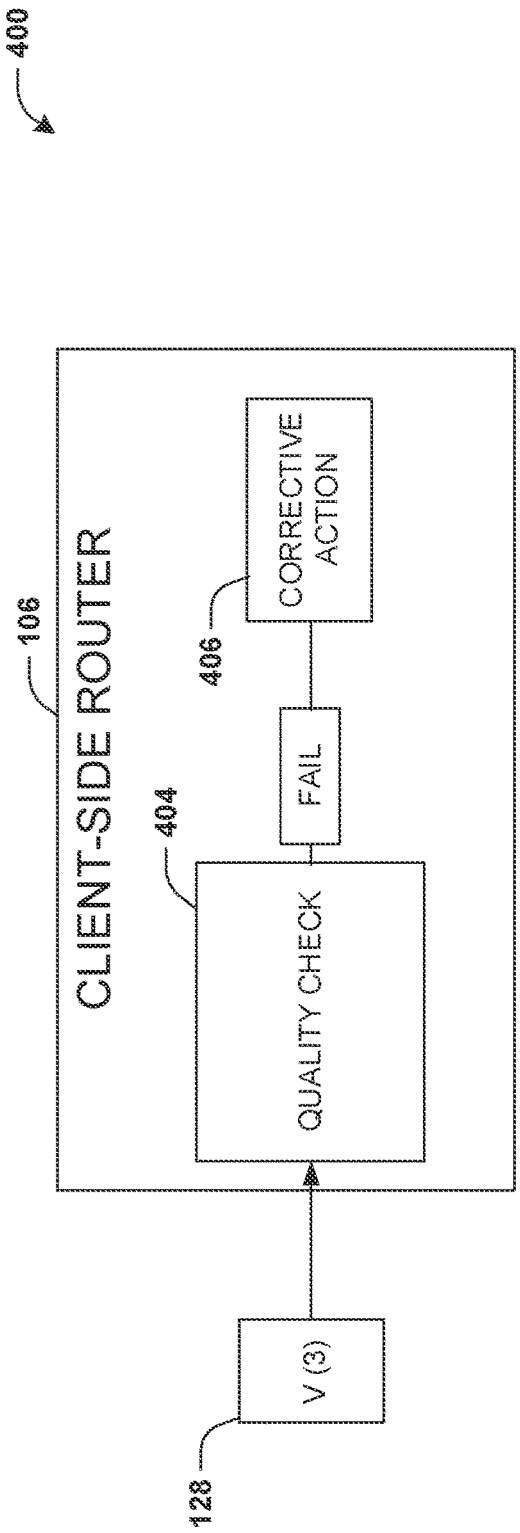

DETECTING A QUALITY ISSUE ASSOCIATED WITH A VIDEO STREAM DELIVERY

BACKGROUND

Various types of services and devices may provide platforms for viewing and/or downloading content, such as videos. For example, a video may be delivered to a client device. However, data corruption, missing video frames, incorrect parameters, etc. of the video can cause playback issues when the video is presented.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 3A is a diagram illustrating an example scenario associated with detection of a quality issue.

FIG. 3B is a diagram illustrating an example scenario associated with detection of a quality issue.

FIG. 4A is a diagram illustrating an example scenario associated with detection of a quality issue.

FIG. 4B is a diagram illustrating an example scenario associated with detection of a quality issue.

FIG. 10 is an illustration of an example environment in which at least a portion of the techniques presented herein may be utilized and/or implemented.

DETAILED DESCRIPTION OF EXAMPLE EMBODIMENTS

Figure 1A:
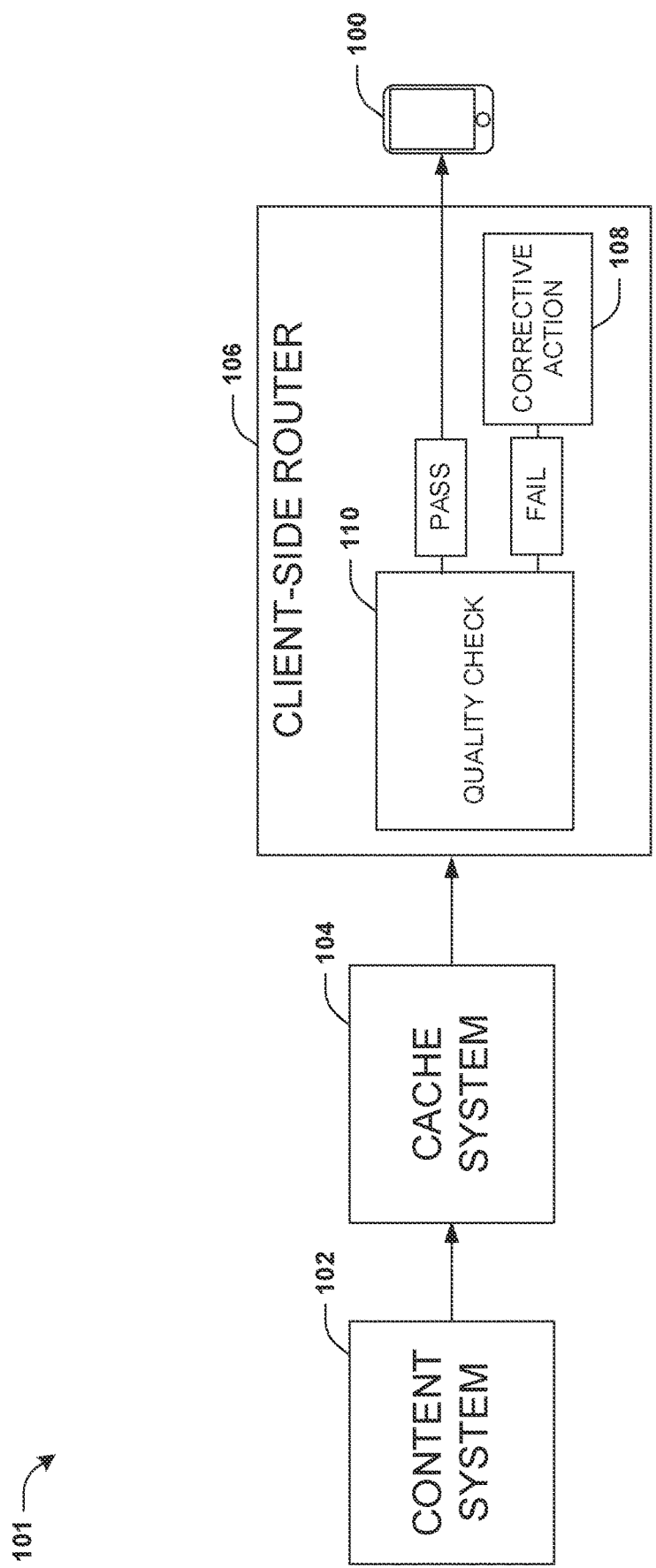
FIG. 1A is a diagram illustrating an example system for delivering video streams.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for delivering video streams are provided. For example, a user (and/or a client device associated with the user) may access and/or interact with a service, such as at least one of a browser, software, a website, an application, an operating system, etc. that provides a platform for viewing and/or downloading video streams of a content system. A video stream may be delivered to the client device for presentation, such as in response to a request for presentation of the video stream. There may be one or more quality issues associated with the video stream. For example, one or more portions of the video stream delivered to the client device may have at least one of data corruption, one or more missing video frames, one or more incorrect parameters, etc. Alternatively and/or additionally, one or more portions of the video stream may not be received by the client device. The one or more quality issues may negatively impact presentation of the video stream via the client device, such as by resulting in lagging, stuttering and/or glitches during playback of the video stream, the client device being unable to play a portion of the video stream, choppy playback of a portion of the video stream, playback errors, etc.

Accordingly, as provided herein, a client-side router may analyze and/or monitor video stream chunks of the video stream and/or statuses associated with video stream chunks to check for quality issues associated with video stream chunks. The client-side router may transmit a video stream chunk to the client device in response to determining that the video stream chunk is not associated with a quality issue. Alternatively and/or additionally, the client-side router may perform one or more corrective actions in response to detecting a quality issue associated with a video stream chunk. In an example, the one or more corrective actions may comprise transmitting, to a cache node, a request for a corrective video stream chunk. The client-side router may receive the corrective video stream chunk, and transmit the corrective video stream chunk to the client device. In some examples, the corrective video stream chunk may be delivered to the client device prior to depletion of a buffer associated with presentation of the video stream to provide for smooth playback of the video stream (without causing a pause in playback associated with late delivery of the corrective video stream chunk, for example).

In some examples, the client-side router may be associated with a service (e.g., at least one of an internet service provider (ISP), a content provider, a quadrature amplitude modulation (QAM)-less television provider, etc.) for providing content, such as video streams, to client devices. The client-side router may be configured to provide for utilization of the service. For example, the client-side router may be provided to a user of a subscription associated with the service, and/or may be used to facilitate delivery of content (e.g., video streams) to one or more client devices communicatively coupled (via a local area network, for example) to the client-side router. At least some aspects of the client-side router may be controlled by the service. For example, a router control system associated with the service may provide the client-side router with instructions and/or updates (e.g., software updates and/or firmware updates) to enable the client-side router to deliver content to the client device and/or to perform operations in accordance with one or more of the techniques provided herein. Among components controlled by the service to stream content to the client device, the client-side router may be closest to the client device in a delivery path through which content is streamed to the client device (e.g., in the delivery path, the client-side router may be the last of the components controlled by the service). Enabling the client-side router to check for quality issues associated with video chunks may provide for a higher rate of detecting quality issues associated with video chunks prior to the video chunks reaching the client device (which may or may not be controlled by the service), in comparison to utilizing other components, that are further away in the delivery path from the client device, to check for quality issues. The higher rate may be due at least to the client-side router being able to detect quality issues associated with video stream impairments (e.g., data corruption, packet loss, etc.) that occur at points in the delivery path that are between the client-side router and the other components.

FIGS. 1A-1D illustrate examples of a system 101 for delivering video streams. A first client device 100 (e.g., a phone, a laptop, a computer, a wearable device, a smart device, a television, any other type of computing device, hardware and/or software) may be provided with access to content of a content system 102. The content may comprise video streams (e.g., at least one of TV channels, live channels, video on demand (VOD) videos, pre-recorded videos, livestream videos, movies, TV shows, sports videos, news-related videos, news channel video clips, internet news video clips, educational videos, how-to videos, educational video clips, documentaries, entertainment videos, sports-related video clips, informational videos, interview-related videos, video clips of meetings, advertisements, etc.) and/or one or more other types of content.

FIG. 1A illustrates delivery of video content of the content system 102 to the first client device 100, according to some example embodiments. In some examples, the content system 102 provides content for storage on cache nodes of a cache system 104 (e.g., a cache system of a content delivery network (CDN)). A cache node of the cache system 104 may comprise a computer configured to store content (e.g., one or more video streams and/or one or more other types of content), and/or provide the content for delivery to one or more client devices. In an example, a set of content (e.g., a set of video streams) of the content system 102 may be provided to and/or stored on a cache node of the cache system 104 (e.g., the set of content may be provided to and/or stored on the cache node using a caching appliance).

A video stream, of the set of content stored on the cache node, may be delivered to the first client device 100 (e.g., the cache node may be utilized for delivering video streams to the first client device 100 based upon the first client device 100 being in a geographical region corresponding to the cache node). For example, the cache node of the cache system 104 may transmit video stream chunks of the video stream to a client-side router 106 (e.g., a broadband home router (BHR)) associated with the first client device 100. The client-side router 106 may analyze a video stream chunk received from the cache node to determine whether to transmit (e.g., forward) a video stream chunk of the video stream to the first client device 100. For example, a quality check 110 may be performed to check whether a video stream chunk has a quality issue. If the video stream chunk passes the quality check 110 (e.g., the client-side router 106 determines that the video stream chunk is not associated with a quality issue), the client-side router 106 may transmit the video stream chunk to the first client device 100. If the video stream chunk fails the quality check 110 (e.g., the client-side router 106 determines that the video stream chunk is associated with one or more quality issues), the client-side router 106 may perform one or more corrective actions 108 in accordance with one or more of the techniques presented herein.

Figure 1B:
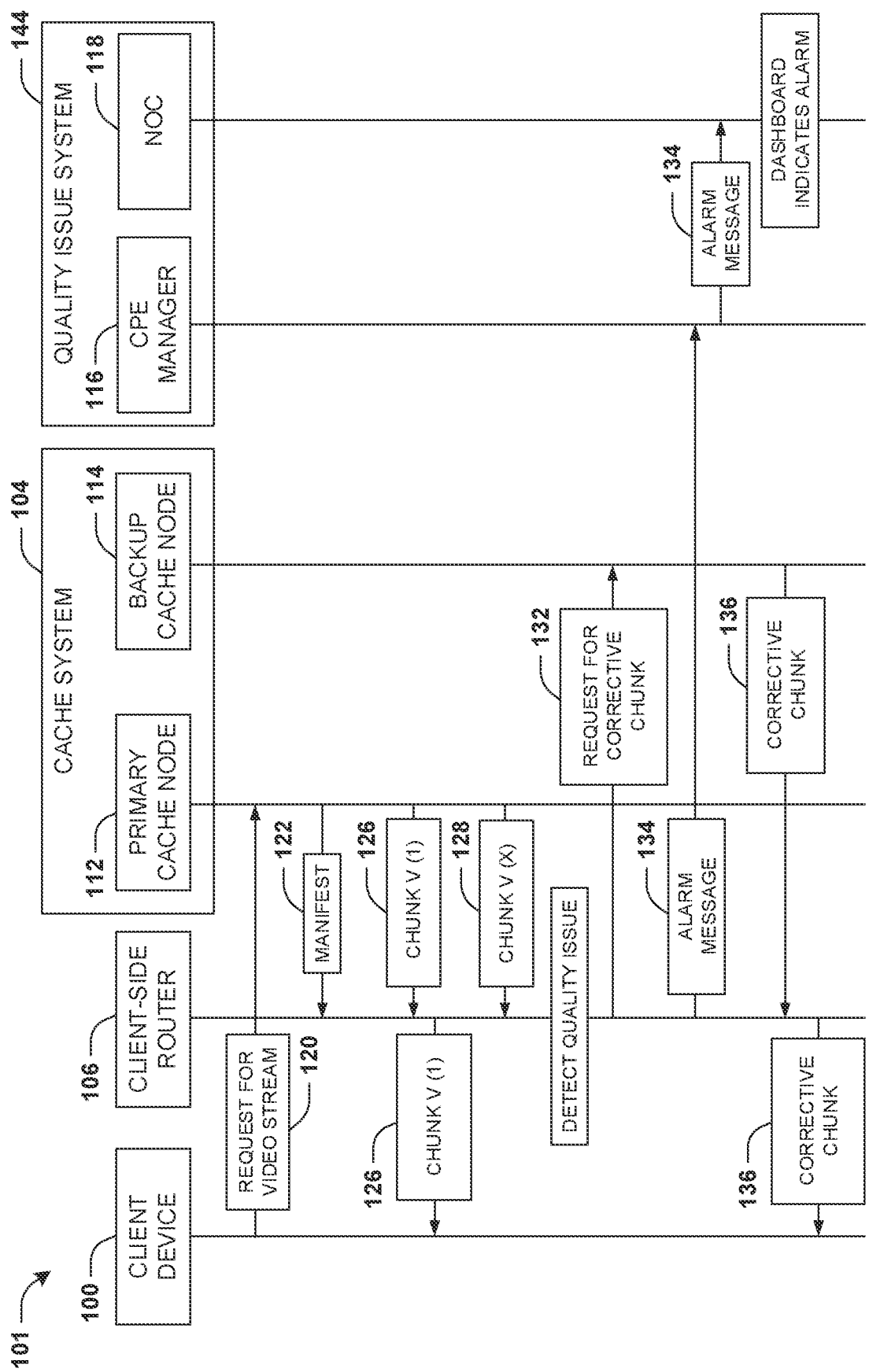
FIG. 1B is a diagram illustrating an example system for delivering video streams.
Figure 1C:
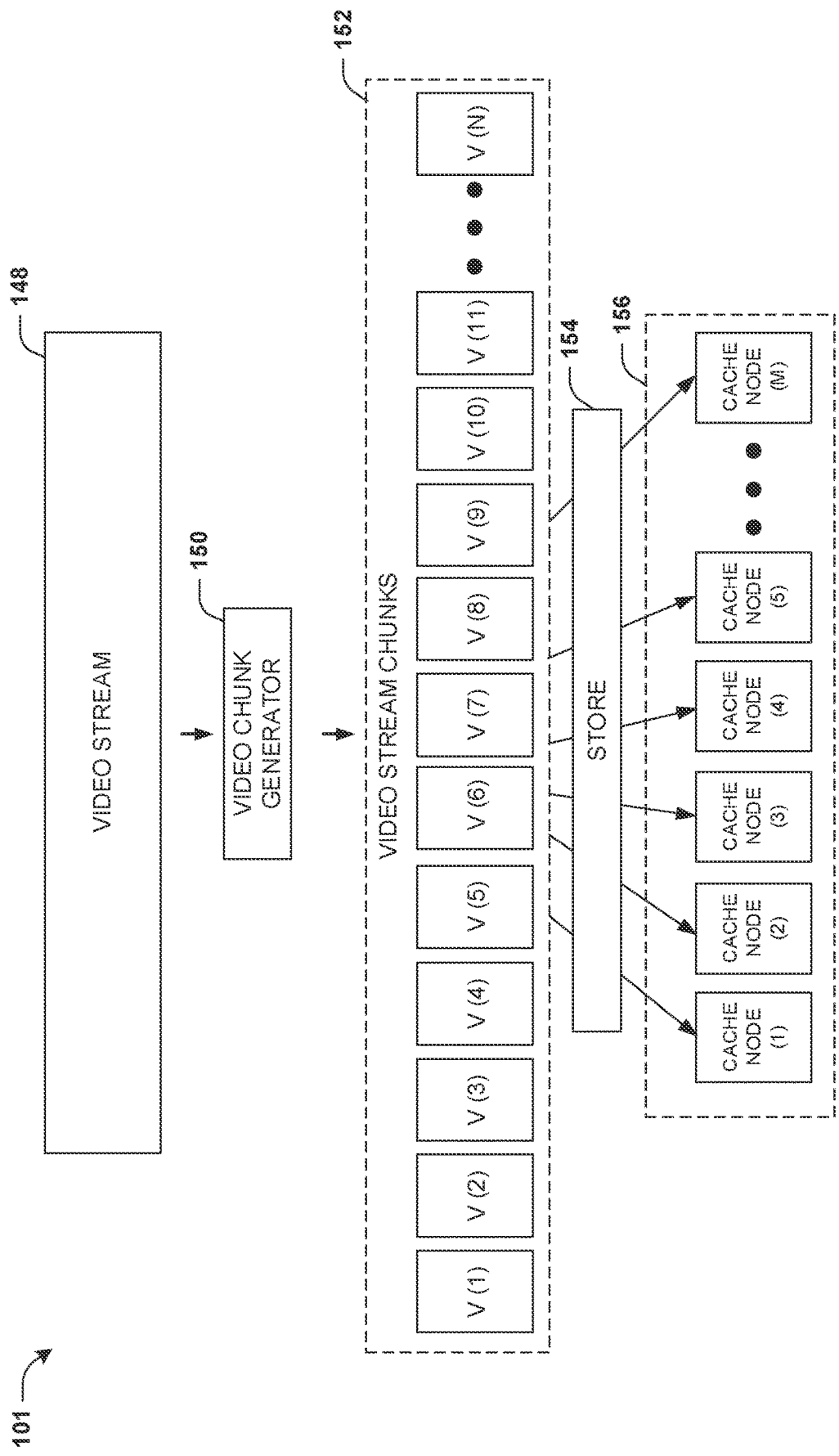
FIG. 1D is a diagram illustrating an example system for delivering video streams, where a manifest is transmitted to a client-side router.

FIG. 1B illustrates a scenario associated with delivery of a video stream to the first client device 100, according to some example embodiments. The first client device 100 may transmit a request 120 for presentation of a video stream to a first cache node 112 of the cache system 104. In an example, the video stream may comprise at least one of a TV channel, a live channel, a VOD video, a pre-recorded video, a livestream video, a movie, a TV show, a sports video, a news-related video, a news channel video clip, an internet news video clip, an educational video, a how-to video, an educational video clip, a documentary, an entertainment video, a sports-related video clip, an informational video, an interview-related video, a video clip of a meeting, an advertisement, etc. In some examples, the request 120 may be transmitted to the first cache node 112 via the client-side router 106 (e.g., the first client device 100 may transmit the request 120 to the client-side router 106, and the client-side router 106 may transmit (e.g., forward) the request 120 to the first cache node 112).

In some examples, the request 120 for presentation of the video stream may be transmitted by the first client device 100 and/or the client-side router 106 in response to one or more selections of one or more selectable inputs of a video interface. For example, a graphical user interface of the first client device 100 may be controlled to display the video interface comprising a list of videos associated with video streams (e.g., video streams provided by the content system 102). In some examples, the first client device 100 and/or the client-side router 106 may transmit the request 120 in response to a selection of a selectable item, of the list of videos, corresponding to the video stream. Alternatively and/or additionally, the video interface may comprise a conversational interface. The first client device 100 and/or the client-side router 106 may transmit the request 120 in response to receiving a voice command, indicative of presenting the video stream, via the conversational interface. For example, the first client device 100 may utilize speech recognition (e.g., a virtual assistant) to identify the voice command and/or authorize transmission of the request 120.

In some examples, the first cache node 112 may be a primary cache node with respect to the first client device 100 and/or the client-side router 106. For example, the first client device 100 and/or the client-side router 106 may access a stored list of cache nodes indicative of at least one of cache node identifiers, cache node addresses, network addresses, etc. of cache nodes. In some examples, one or more cache nodes of the stored list of cache nodes may correspond to primary cache nodes. For example, the first client device 100 and/or the client-side router 106 may be configured to attempt to request and/or receive content from a primary cache node of the stored list of cache nodes prior to attempting to request and/or receive content from a nonprimary cache node of the stored list of cache nodes. The first client device 100 and/or the client-side router 106 may identify the one or more primary cache nodes of the stored list of cache nodes based upon a configuration with which the first client device 100 and/or the client-side router 106 are configured. Alternatively and/or additionally, the first client device 100 and/or the client-side router 106 may receive a message indicative of the one or more primary cache nodes. The first client device 100 and/or the client-side router 106 may identify the one or more primary cache nodes based upon the message. In some examples, the request 120 for presentation of the video stream may be transmitted to the first cache node 112 based upon a determination that the first cache node 112 is a primary cache node of the one or more primary cache nodes.

Figure 10:
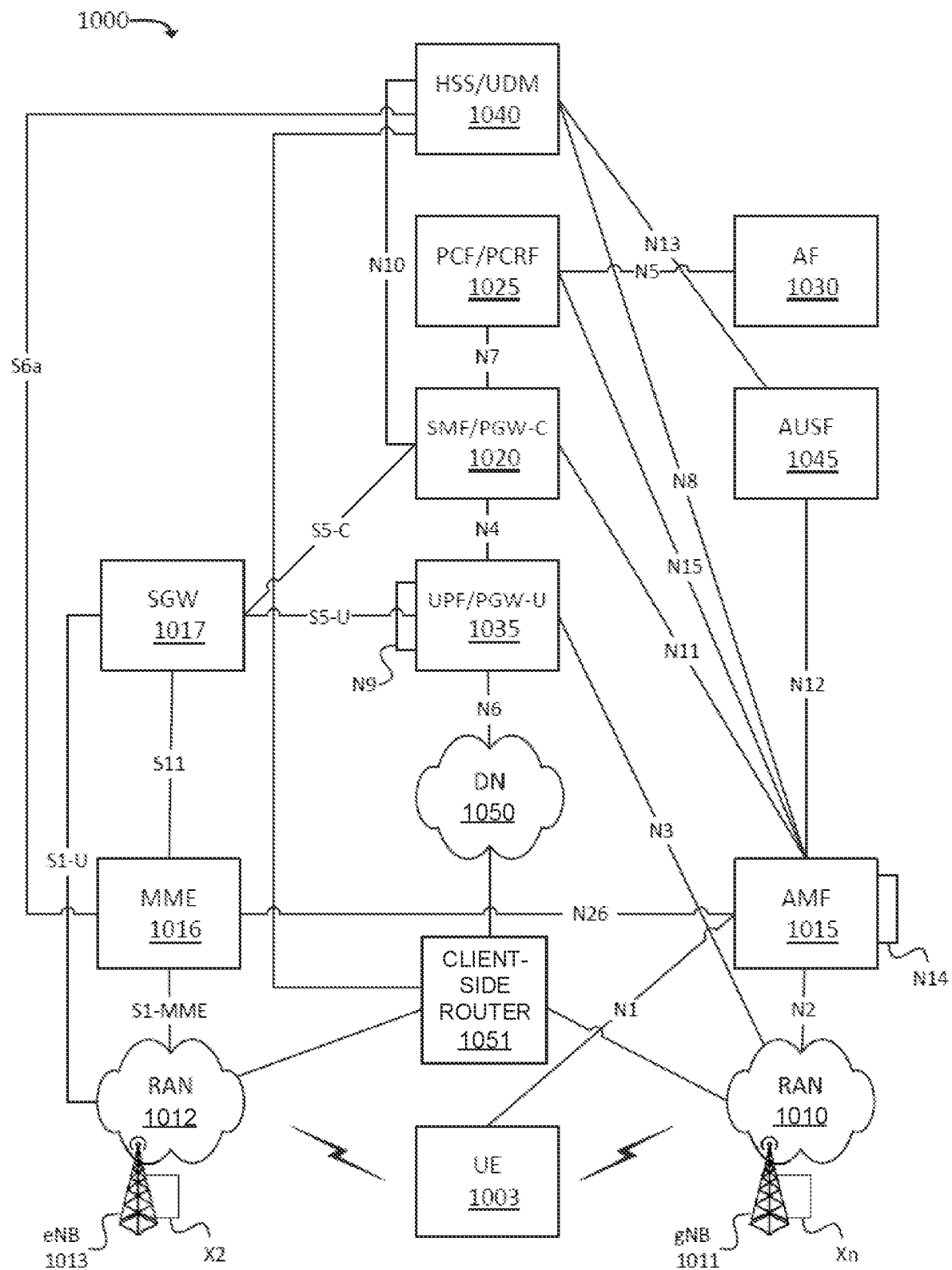
FIG. 10 is a diagram illustrating an example system for delivering video streams, where video stream chunks are stored on cache nodes of a cache system.

In some examples, a set of video stream chunks 152 (e.g., a set of N video stream chunks) of the video stream may be stored on a set of cache nodes 156 (e.g., a set of M cache nodes) of the cache system 104, as illustrated by FIG. 10. A video stream chunk of the set of video stream chunks 152 may comprise a video segment of the video stream. The video stream is shown with reference number 148 in FIG. 10. The set of cache nodes 156 may comprise the first cache node 112. In some examples, the video stream (shown with reference number in FIG. 10) may be input to a video stream chunk generator 150. The video stream chunk generator 150 may generate the set of video stream chunks 152 using the video stream (e.g., the set of video stream chunks 152 may be generated by segmenting the video stream into the set of video stream chunks 152). In some examples, the set of video stream chunks 152 may be generated (e.g., the video stream may be segmented into the set of video stream chunks 152) based upon one or more streaming specifications associated with presenting the video stream via client devices. In an example, the one or more streaming specifications may indicate a first duration of time (e.g., about 2 seconds, about 4 seconds, about 30 seconds, or other duration of time) of a video stream chunk. The set of video stream chunks 152 may be generated in accordance with the first duration of time (e.g., a duration of time of a video stream chunk of the set of video stream chunks 152 may be about equal to the first duration of time). In some examples, the set of video stream chunks 152 may be stored 154 on each cache node of the set of cache nodes 156. Embodiments are contemplated in which the video stream is stored on a cache node of the set of cache nodes 156, and the cache node uses the video stream to generate and/or store the set of video stream chunks 152, such as in accordance with one or more of the techniques provided herein.

Figure 1D:
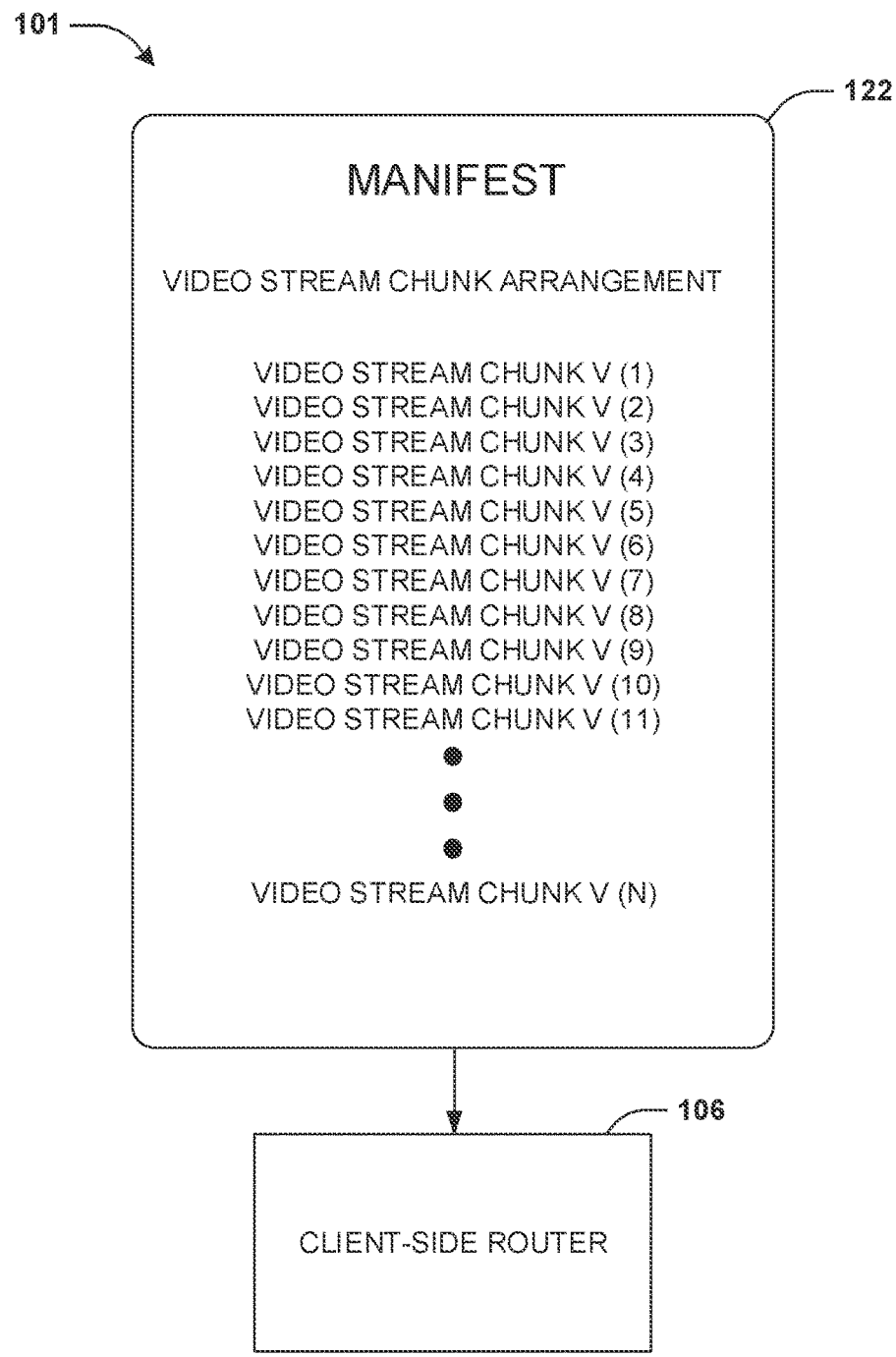

As illustrated in FIG. 1B, the first cache node 112 may transmit a manifest 122, associated with the video stream, to the client-side router 106. For example, the manifest 122 may be transmitted to the client-side router 106 in response to receiving the request 120. FIG. 1D illustrates transmission of the manifest 122 to the client-side router 106, according to some example embodiments. In some examples, the manifest 122 may be used for presentation of video stream chunks, of the set of video stream chunks 152, via the first client device 100 (and/or the manifest 122 may be used for transmission of video stream chunks, of the set of video stream chunks 152, to the first client device 100). In some examples, the manifest 122 may be indicative of an arrangement of the set of video stream chunks 152. Accordingly, the client-side router 106 may determine the arrangement of the set of video stream chunks 152 using the manifest 122.

The arrangement may correspond to an order with which video stream chunks of the set of video stream chunks 152 are presented. For example, the arrangement may indicate a video stream chunk of the set of video stream chunks 152 that is initially presented, a video stream chunk of the set of video stream chunks 152 that is presented following (e.g., directly following) the video that is initially presented, etc. The manifest 122 may indicate video stream chunk identifiers associated with video stream chunks of the set of video stream chunks 152. The manifest 122 may indicate that a first video stream chunk, associated with a first video stream chunk identifier, precedes (e.g., is presented before) a second video stream chunk associated with a second video stream chunk identifier. A video stream chunk identifier of a video stream chunk may comprise one or more characters (e.g., a sequence of one or more letters, one or more numbers and/or one or more symbols) that identify the video stream chunk. In FIG. 1D, video stream chunk identifiers associated with the set of video stream chunks 152 may comprise "V (#)", wherein # ranges from 1 through N. As an example, the arrangement indicated by the manifest 122 may indicate a video stream chunk "V (1)" as an initial video stream chunk of the set of video stream chunks 152 (e.g., the video stream chunk "V (1)" corresponds to a video stream chunk associated with a video stream chunk identifier "V (1)"), followed by a video stream chunk "V (2)", followed by a video stream chunk "V (3)", etc. It may be appreciated that the arrangement may be indicated by the manifest 122 in different ways than that shown in FIG. 1D.

In some examples, the video stream (e.g., the set of video stream chunks 152) (and/or the manifest 122) may be stored on the first cache node 112 when the request 120 is received by the first cache node 112. For example, the video stream (and/or the manifest 122) may be stored on the first cache node 112 prior to reception of the request 120.

Alternatively and/or additionally, the video stream (and/or the manifest 122) may not be stored on the first cache node 112 when the request 120 is received by the first cache node 112. In some examples, if the video stream (and/or the manifest 122) are not stored on the first cache node 112 when the request 120 is received by the first cache node 112, the first cache node 112 may retrieve the video stream (and/or the manifest 122) in response to receiving the request 120 (e.g., the first cache node 112 may retrieve the video stream (and/or the manifest 122) from a database).

Video stream chunks of the video stream may be received, by the client-side router 106, for presentation via the first client device 100. In some examples, the client-side router 106 may monitor and/or analyze the video-stream chunks, the manifest, and/or statuses of video-stream chunks of the video stream, to check for one or more quality issues. The client-side router 106 may transmit (e.g., forward) a video stream chunk of the video stream to the first client device 100 based upon a determination that the video stream chunk is not associated with a quality issue. Alternatively and/or additionally, the client-side router 106 may perform one or more corrective actions responsive to detecting a quality issue associated with a video stream chunk.

Figure 2:
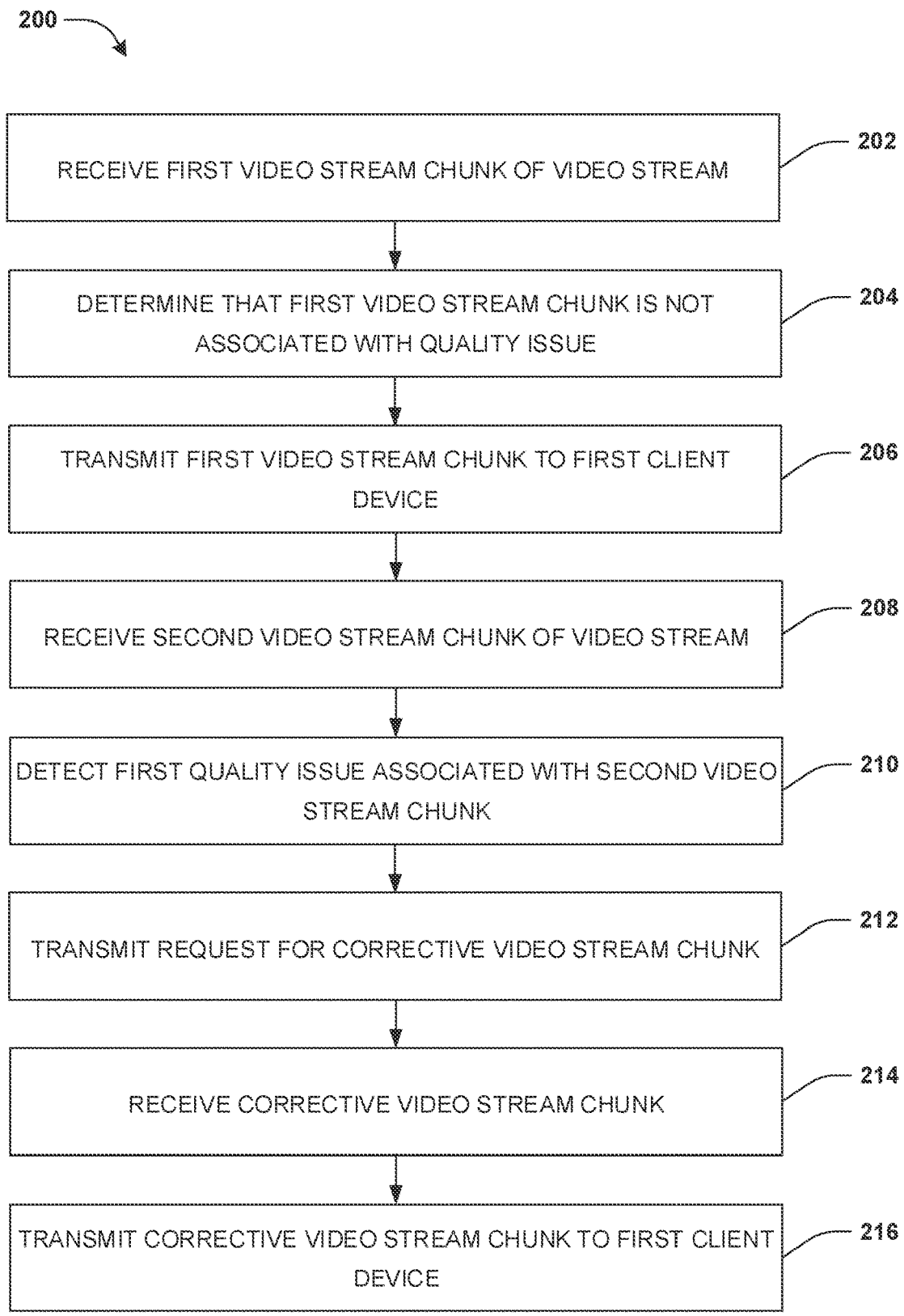
FIG. 2 is a flow chart illustrating an example method for delivering video streams.

An embodiment of delivering video streams is illustrated by an exemplary method 200 of FIG. 2, and is further described in conjunction with the system 101 of FIGS. 1A-1D. At 202, a first chunk 126 (e.g., a first video stream chunk) of the video stream may be received, such as illustrated in FIG. 1B. For example, the first chunk 126 may be received by the client-side router 106 for presentation via the first client device 100. In an example, the first chunk 126 may correspond to the video stream chunk "V (1)", or a different video stream chunk of the set of video stream chunks 152. The first cache node 112 may transmit the first chunk 126, to the client-side router 106, in response to receiving the request 120. In some examples, the request 120 may comprise identification information of the first client device 100 and/or the client-side router 106. The first cache node 112 may determine, based upon the identification information, that the request 120 is associated with the client-side router 106 (and/or the first client device 100). The first cache node 112 may transmit the first chunk 126 to the client-side router 106 based upon the determination that the request 120 is associated with the client-side router 106 (and/or the first client device 100).

In some examples, a quality check may be performed in response to receiving the first chunk 126. At 204 of FIG. 2, it may be determined that the first chunk 126 is not associated with a quality issue. For example, the first chunk 126 may be analyzed by the client-side router 106 to determine whether the first chunk 126 is associated with one or more quality issues. The client-side router 106 may determine that the first chunk 126 is not associated with a quality issue and/or that the first chunk 126 passes the quality check.

At 206 of FIG. 2, the first chunk 126 may be transmitted to the first client device 100, such as illustrated in FIG. 1B. The first chunk 126 may be transmitted by the client-side router 106 to the first client device 100 based upon (and/or in response to) determining that first chunk 126 is not associated with a quality issue and/or that the first chunk 126 passes the quality check. The first client device 100 may present the first chunk 126 in response to receiving the first chunk 126 from the client-side router 106. In an example, the first client device 100 may load the first chunk 126 into a buffer prior to presenting the first chunk 126.

At 208 of FIG. 2, a second chunk 128 (e.g., a second video stream chunk) of the video stream (e.g., video stream chunk "V (X)" of the set of video stream chunk 152) may be received, such as illustrated in FIG. 1B. The second chunk 128 may be received by the client-side router 106. In an example, one or more video stream chunks (comprising the first chunk 126), of the set of video stream chunks 152, may be received by the client-side router 106 prior to reception of the second chunk 128.

In some examples, a quality check may be performed in response to receiving the second chunk 128. At 210 of FIG. 2, a first quality issue associated with the second chunk 128 may be detected. For example, the second chunk 128 may be analyzed by the client-side router 106 to determine whether the second chunk 128 is associated with one or more quality issues. The client-side router 106 may detect the first quality issue associated with the second chunk 128. For example, the client-side router 106 may determine that the second chunk 128 is associated with the first quality issue and/or that the second chunk 128 fails the quality check.

The client-side router 106 may perform one or more corrective actions based upon the first quality issue. At 212 of FIG. 2, a request 132 for a corrective chunk 136 (e.g., a corrective video stream chunk) may be transmitted, such as illustrated in FIG. 1B. The request 132 for the corrective chunk 136 may be transmitted in response to detecting the first quality issue associated with the second chunk 128. For example, the client-side router 106 may transmit the request 132 for the corrective chunk 136 to a second cache node 114. In some examples, the client-side router 106 transmits the request 132 based upon the first quality issue (e.g., the client-side router 106 may transmit the request 132 in response to detecting the first quality issue and/or determining that the second chunk 128 is associated with the first quality issue). At 214 of FIG. 2, the corrective chunk 136 may be received, such as illustrated in FIG. 1B. For example, the client-side router 106 may receive the corrective chunk 136 from the second cache node 114.

At 216 of FIG. 2, the corrective chunk 136 is transmitted to the first client device 100, such as illustrated in FIG. 1B. For example, the client-side router 106 may transmit the corrective chunk 136 to the first client device 100. For example, the corrective chunk 136 may be transmitted to the first client device 100 in response to receiving the corrective chunk 136 from the second cache node 116. In some examples, a quality check may be performed in response to receiving the corrective chunk 136. For example, the corrective chunk 136 may be analyzed by the client-side router 106 to determine whether the corrective chunk 136 is associated with one or more quality issues. The client-side router 106 may determine that the corrective chunk 136 is not associated with a quality issue (e.g., the client-side router 106 may determine that the corrective chunk 136 passes the quality check). The corrective chunk 136 may be transmitted to the first client device 100 based upon (and/or in response to) determining that the corrective chunk 136 is not associated with a quality issue and/or that the corrective chunk 136 passes the quality check. The first client device 100 may present the corrective chunk 136 in response to receiving the corrective chunk 136 from the client-side router 106. In an example, the first client device 100 may load the corrective chunk 136 into the buffer prior to presenting the corrective chunk 136.

In an example in which the client-side router 106 determines that the corrective chunk 136 is associated with a quality issue (e.g., that the corrective chunk 136 fails the quality check), the first client device 100 may perform one or more second corrective actions to obtain a second corrective chunk (e.g., a second corrective video stream chunk). For example, the one or more second corrective actions may comprise transmitting a second request for the second corrective chunk to a cache node (e.g., the second cache node 116 and/or a third cache node), receiving the second corrective chunk and/or performing one or more other operations in accordance with the techniques provided herein.

In some examples, the corrective chunk 136 is transmitted to (and/or received by) the first client device 100 before the buffer associated with presentation of the video stream is depleted. In this way, the first quality issue may be detected, and the one or more corrective actions may be performed to obtain the corrective chunk 136 and/or deliver the corrective chunk 136 to the first client device 100, without causing a pause in playback of the video stream.

In some examples, the second cache node 114 may be a backup cache node with respect to the first client device 100 and/or the client-side router 106. In some examples, one or more cache nodes of the stored list of cache nodes (e.g., stored on the first client device 100 and/or the client-side router 106) may correspond to backup cache nodes. For example, the first client device 100 and/or the client-side router 106 may be configured to attempt to request and/or receive corrective content from a backup cache node of the stored list of cache nodes if a quality issue associated with content received from a primary cache node (e.g., the first cache node 112) is detected. The first client device 100 and/or the client-side router 106 may identify the one or more backup cache nodes of the stored list of cache nodes based upon a configuration with which the first client device 100 and/or the client-side router 106 are configured. Alternatively and/or additionally, the first client device 100 and/or the client-side router 106 may receive a message indicative of the one or more backup cache nodes. The first client device 100 and/or the client-side router 106 may identify the one or more backup cache nodes based upon the message. In some examples, the request 132 for the corrective chunk 136 may be transmitted to the second cache node 114 based upon a determination that the second cache node 114 is a backup cache node of the one or more backup cache nodes.

In some examples, the first quality issue corresponds to corruption of the second chunk 128. For example, the corruption of the second chunk 128 may correspond to at least one of one or more errors in data of the second chunk 128, one or more changes to data of the second chunk 128, out of sequence data of the second chunk 128, etc. In some examples, the first quality issue (e.g., the corruption) may be detected by performing one or more corruption detection techniques on the second chunk 128.

Alternatively and/or additionally, the first quality issue may correspond to the second chunk 128 missing data (e.g., video data). For example, the data (that is missing from the second chunk 128 received from the first cache node 112) may correspond to at least one of one or more video frames, one or more data packets, etc. In some examples, the client-side router 106 may determine that the second chunk 128 is missing the data by analyzing (e.g., scanning) the second chunk 128 to determine that the second chunk 128 is incomplete.

Alternatively and/or additionally, the first quality issue may correspond to the second chunk 128 having one or more incorrect parameters (e.g., one or more incorrect video parameters). The one or more incorrect parameters may comprise one or more video parameters, of the second chunk 128, that are incompatible with the first client device 100 (e.g., the first client device 100 is unable to decode and/or play the second chunk 128 due to the one or more video parameters). Alternatively and/or additionally, the one or more incorrect parameters may comprise one or more video parameters, of the second chunk 128, that are different than video parameters with which the first client device 100 is configured to decode and/or play video stream chunks of the video stream. Alternatively and/or additionally, the one or more incorrect parameters may comprise one or more video parameters, of the second chunk 128, that are different than video parameters of other video stream chunks of the video stream. Alternatively and/or additionally, the one or more incorrect parameters may comprise one or more video parameters, of the second chunk 128, that are different than video parameters, of the video stream, indicated by the manifest 122. Alternatively and/or additionally, the one or more incorrect parameters may comprise one or more video parameters that are less than a threshold and/or that exceed a threshold. In some examples, the one or more incorrect parameters may comprise at least one of one or more parameters associated with a video resolution of the second chunk 128, one or more parameters associated with a frame rate of the second chunk 128, one or more parameters associated with a codec of the second chunk 128, one or more parameters associated with compression of the second chunk 128, one or more parameters associated with a format of the second chunk 128, etc. In an example, the first quality issue may correspond to the second chunk 128 having a frame rate that is less than a first frame rate threshold, or that exceeds a second frame rate threshold. Alternatively and/or additionally, the first quality issue may correspond to the second chunk 128 having a video resolution that is less than a first video resolution threshold, or that exceeds a second video resolution threshold.

In some examples, the corrective chunk 136 is a replacement for the second chunk 128. For example, the request 132 for the corrective chunk 136 may be a request for a replacement for the second chunk 128. In some examples, the request 132 may comprise a video stream chunk identifier (e.g., "V (X)") of the second chunk 128 and/or may indicate that a replacement for the second chunk 128 associated with the video stream chunk identifier is requested. The video stream chunk identifier of the second chunk 128 may be determined based upon the second chunk 128 (received at act 208 of FIG. 2) and/or the manifest 122. The client-side router 106 may request a replacement for the second chunk 128 (and/or the client-side router 106 may include the video stream chunk identifier of the second chunk 128 in the request 132 transmitted to the second cache node 114) based upon a determination that a replacement for the second chunk 128 is required in order to present the video stream via the first client device 100 (e.g., the replacement for the second chunk 128 is required in order to present the video stream without a loss in quality). Alternatively and/or additionally, the client-side router 106 may request a replacement for the second chunk 128 (and/or the client-side router 106 may include the video stream chunk identifier of the second chunk 128 in the request 132 transmitted to the second cache node 114) based upon the first quality issue corresponding to at least one of corruption of the second chunk 128, the second chunk 128 missing data, the second chunk 128 having one or more incorrect parameters, etc.

FIGS. 3A-3B illustrate a scenario 300 associated with detection of the first quality issue, described herein with respect to the system 101 of FIGS. 1A-1D, according to some example embodiments. FIG. 3A illustrates reception of the first chunk 126 and performance of a quality check 302. In the scenario 300, the first chunk 126 may correspond to the video stream chunk "V (1)" identified by the manifest 122. In response to receiving the video stream chunk "V (1)", the client-side router 106 may perform the quality check 302 by analyzing the video stream chunk "V (1)" and/or the manifest 122 to determine whether the video stream chunk "V (1)" is associated with one or more quality issues. The video stream chunk "V (1)" may pass the quality check 302 (e.g., the client-side router 106 may determine that the video stream chunk "V (1)" is not associated with a quality issue). The client-side router 106 may transmit the video stream chunk "V (1)" to the first client device 100 based upon the quality check 302 (e.g., based upon the video stream chunk "V (1)" passing the quality check 302 and/or based upon the video stream chunk "V (1)" not being associated with a quality issue).

FIG. 3B illustrates reception of the second chunk 128 and performance of a quality check 304. In the scenario 300, the second chunk 128 may correspond to the video stream chunk "V (2)", that is identified by the manifest 122 as following (e.g., directly following) the video stream chunk "V (1)". The video stream chunk "V (2)" may be received after reception of the video stream chunk "V (1)". In response to receiving the video stream chunk "V (2)", the client-side router 106 may perform the quality check 304 by analyzing the video stream chunk "V (2)" and/or the manifest 122 to determine whether the video stream chunk "V (2)" is associated with one or more quality issues. The video stream chunk "V (2)" may fail the quality check 304 (e.g., the client-side router 106 may determine that the video stream chunk "V (2)" is associated with the first quality issue), such as based upon at least one of the video stream chunk "V (2)" being corrupted, the video stream chunk "V (2)" missing data, the video stream chunk "V (2)" having one or more incorrect parameters, etc. The client-side router 106 may perform one or more corrective actions 306 based upon the quality check 304 (e.g., based upon the video stream chunk "V (2)" failing the quality check 304 and/or based upon the first quality issue). For example, the one or more corrective actions 306 may comprise transmitting the request 132 for the corrective chunk 136 to the second cache node 114, receiving the corrective chunk 136 from the second cache node 114 and/or transmitting (e.g., forwarding) the corrective chunk 136 to the first client device 100.

In some examples, the corrective chunk 136 may correspond to a video stream chunk different than the second chunk 128, such as in a scenario in which video stream chunks of the video stream are received out of order. In some examples, the client-side router 106 may determine that video stream chunks of the video stream are received out of order based upon the arrangement of video stream chunks indicated by the manifest 122.

In an example, the corrective chunk 136 may correspond to a third video stream chunk, of the set of video stream chunks 152, different than the second chunk 128. The third video stream chunk may be before the second chunk 128 in the arrangement indicated by the manifest 122 (e.g., the manifest 122 may indicate that presentation of the third video stream chunk is before presentation of the second chunk 128). The first quality issue may correspond to the third video stream chunk not being received prior to reception of the second chunk 128 (e.g., the second chunk 128 is received out of order). The first quality issue may be detected by analyzing a video stream chunk identifier of the second chunk 128 and/or the manifest 122 (e.g., the video stream chunk identifier and/or the manifest 122 may be analyzed in response to receiving the second chunk 128 at act 208 of FIG. 2). In some examples, the client-side router 106 may determine, based upon the video stream chunk identifier of the second chunk 128 and the arrangement indicated by the manifest 122 that the third video stream chunk is missing (e.g., is not yet received) at a time of reception of the second chunk 128 (even though the third video stream chunk is before the second chunk 128 in the arrangement indicated by the manifest 122). The client-side router 106 may perform one or more corrective actions to obtain the third video stream chunk (e.g., the corrective chunk 136) and/or deliver the third video stream chunk to the first client device 100.

In some examples, the request 132 for the corrective chunk 136 may comprise a video stream chunk identifier of the third video stream chunk (e.g., the corrective chunk 136) and/or may indicate that the third video stream chunk associated with the video stream chunk identifier is requested. The video stream chunk identifier of the third video stream chunk may be determined based upon the manifest 122. The client-side router 106 may request the third video stream chunk (and/or the client-side router 106 may include the video stream chunk identifier of the third video stream chunk in the request 132) based upon a determination that the third video stream chunk is missing (e.g., is not yet received) at a time of reception of the second chunk 128 (even though the third video stream chunk is before the second chunk 128 in the arrangement indicated by the manifest 122). Alternatively and/or additionally, the client-side router 106 may request the third video stream chunk (and/or the client-side router 106 may include the video stream chunk identifier of the third video stream chunk in the request 132 transmitted to the second cache node 114) based upon a determination that a threshold duration of time has passed since the time of reception of the second chunk 128 and that the third video stream chunk has not yet been received.

FIGS. 4A-4B illustrate a scenario 400 associated with detection of the first quality issue, described herein with respect to the system 101 of FIGS. 1A-1D, according to some example embodiments. FIG. 4A illustrates reception of the first chunk 126 and performance of a quality check 402. In the scenario 400, the first chunk 126 may correspond to the video stream chunk "V (1)" identified by the manifest 122. In response to receiving the video stream chunk "V (1)", the client-side router 106 may perform the quality check 402 by analyzing the video stream chunk "V (1)" and/or the manifest 122 to determine whether the video stream chunk "V (1)" is associated with one or more quality issues. The video stream chunk "V (1)" may pass the quality check 402 (e.g., the client-side router 106 may determine that the video stream chunk "V (1)" is not associated with a quality issue). The client-side router 106 may transmit the video stream chunk "V (1)" to the first client device 100 based upon the quality check 402 (e.g., based upon the video stream chunk "V (1)" passing the quality check 402 and/or based upon the video stream chunk "V (1)" not being associated with a quality issue).

FIG. 4B illustrates reception of the second chunk 128 and performance of a quality check 404. In the scenario 400, the second chunk 128 may correspond to the video stream chunk "V (3)" identified by the manifest 122. Prior to reception of the video stream chunk "V (3)", the client-side router 106 may not receive the video stream chunk "V (2)", which is identified, by the arrangement indicated by the manifest 122, as following (e.g., directly following) the video stream chunk "V (1)", and preceding (e.g., directly preceding) the video stream chunk "V (3)". In response to receiving the video stream chunk "V (3)", the client-side router 106 may perform the quality check 404 by analyzing the video stream chunk "V (3)" and/or the manifest 122 to determine whether the video stream chunk "V (3)" is associated with one or more quality issues. The video stream chunk "V (3)" may fail the quality check 404 (e.g., the client-side router 106 may determine that the video stream chunk "V (3)" is associated with the first quality issue), such as based upon a determination that the video stream chunk "V (2)" is not received prior to reception of the video stream chunk "V (3)". The client-side router 106 may perform one or more corrective actions 406 based upon the quality check 404 (e.g., based upon the video stream chunk "V (2)" failing the quality check 404 and/or based upon the first quality issue). For example, the one or more corrective actions 406 may comprise transmitting the request 132 for the corrective chunk 136 (e.g., the video stream chunk "V (2)") to the second cache node 114, receiving the corrective chunk 136 from the second cache node 114 and/or transmitting (e.g., forwarding) the corrective chunk 136 to the first client device 100.

In some examples, a quality issue associated with a video stream chunk of the video stream may be detected prior to reception of the video stream chunk. The quality issue may be timing-related. For example, the quality issue may correspond to not receiving the video stream chunk by a time.

In some examples, one or more statuses associated with one or more video stream chunks of the video stream may be monitored and/or analyzed (by the client-side router, for example) based upon the manifest 122 to determine whether a video stream chunk of the one or more video stream chunks is associated with a quality issue. For example, a first status associated with a fourth video stream chunk of the video stream may be monitored and/or analyzed, based upon the manifest 122 (e.g., based upon the arrangement of video stream chunks indicated by the manifest 122), to determine whether the fourth video stream chunk is associated with a quality issue. In some examples, the first status associated with the fourth video stream chunk may correspond to whether the fourth video stream chunk is received from the first cache node.

In some examples, the first quality issue is associated with the fourth video stream chunk (that is not yet received). The first quality issue may correspond to not receiving the fourth video stream chunk (from the first cache node, for example) by a first time. The first quality issue may be detected (by the client-side router 106, for example) by determining that the fourth video stream chunk is not received by the first time. In some examples, the first time is determined based upon a second time at which the first client device 100 is expected to present the fourth video stream chunk. In an example, the second time may correspond to a time at which the fourth video stream chunk begins to be presented by the first client device 100 in a scenario in which playback of the video stream is not paused due to delay in receiving the fourth video stream chunk. For example, the second time may correspond to a time at which presentation of a video stream chunk, which precedes (e.g., directly precedes) the fourth video stream chunk in the arrangement indicated by the manifest 122, is expected to finish.

In some examples, the second time may be determined based upon the manifest 122, such as the arrangement indicated by the manifest 122. In an example, the second time may be determined based upon a position of the fourth video stream chunk, as indicated by the arrangement, with respect to the set of video stream chunk 152 of the video stream (e.g., the position may be indicative of a quantity of video stream chunks, of the set of video stream chunks 152, that are before the fourth video stream chunk and/or after the fourth video stream chunk). Alternatively and/or additionally, the second time may be determined based upon a second duration of time between a starting time of the video stream and a starting time of the fourth video stream chunk (e.g., the second duration of time may be determined based upon the manifest 122). Alternatively and/or additionally, the second time may be determined based upon milestone information associated with presentation of the video stream via the first client device 100. In some examples, the client-side router 106 receives the milestone information from the first client device 100. The milestone information may indicate a second time at which a portion of the video stream is presented by the first client device 100.

In an example, the milestone information may indicate that a portion of the video stream, corresponding to a 40 second mark of the video stream, is presented at a third time (e.g., presentation of the portion of the video stream may occur at about 40 seconds into presentation of the video stream). It may be determined, based upon the manifest 122 (e.g., based upon the position of the fourth video stream chunk and/or the second duration of time), that the fourth video stream chunk begins at a 55 second mark of the video stream (e.g., presentation of the fourth video stream chunk may begin at about 55 seconds into presentation of the video stream). The second time may be determined to be about 15 seconds after the third time (e.g., 55 seconds−40 seconds=15 seconds).

In an example, it may be determined (by the client-side router 106, for example) that presentation of the video stream via the first client device 100 begins at a fourth time (e.g., the milestone information may indicate that presentation of the video stream begins at the fourth time). It may be determined, based upon the manifest 122 (e.g., based upon the position of the fourth video stream chunk and/or the second duration of time), that the fourth video stream chunk begins at a 55 second mark of the video stream (e.g., presentation of the fourth video stream chunk may begin at about 55 seconds into presentation of the video stream). The second time may be determined to be about 55 seconds after the fourth time.

In some examples, the first time may be the same as the second time. Alternatively and/or additionally, the first time may be different than (e.g., before or after) the second time. For example, the first time may be a third duration of time before the second time (e.g., the first time may be before the second time, and a duration of time between the first time and the second time may correspond to the third duration of time). In some examples, the first time (and/or the third duration of time by which the first time precedes the second time) may be configured such that one or more corrective actions can be performed and/or the fourth video stream chunk can be delivered to the first client device 100 prior to the second time, so as to provide for smooth playback without causing a pause due to delay in delivering the fourth video stream chunk to the first client device 100. The one or more corrective actions may comprise transmitting the request 132 for the corrective chunk 136 (where the corrective chunk 136 corresponds to the fourth video stream chunk 136) to the second cache node 114, receiving the corrective chunk 136 from the second cache node 114 and/or transmitting the corrective chunk 136 to the first client device 100.

In some examples, the first quality issue may correspond to not receiving the fourth video stream chunk and a buffer level associated with presentation of the video stream being less than or equal to a threshold buffer level. The buffer level may correspond to an amount of video of the video stream that is loaded into the buffer for presentation via the first client device 100. In some examples, the buffer level is monitored (by the client-side router 106, for example). The second quality issue associated with the fourth video stream chunk may be detected by determining that the buffer level is less than or equal to the threshold buffer level and/or that the fourth video stream chunk is not received. In some examples, the fourth video stream chunk associated with the second quality issue may be identified based upon one or more buffered video stream chunks (loaded into the buffer) and/or the manifest 122. For example, the fourth video stream chunk may be identified based upon a determination that the fourth video stream chunk follows (e.g., directly follows) the one or more buffered video stream chunks in the arrangement of video stream chunks indicated by the manifest 122.

In some examples, the first quality issue may correspond to not receiving the fourth video stream chunk and an available video level associated with the video stream being less than or equal to a threshold available video level. The available video level may correspond to an amount of video of the video stream that is available for presentation via the first client device 100. The available video level may be determined based upon one or more available video stream chunks that are available for presentation via the first client device 100. The one or more available video stream chunks may comprise the one or more buffered video stream chunks, one or more other video stream chunks stored on the first client device 100 (and not yet loaded into the buffer, for example), and/or one or more video stream chunks stored on the client-side router 106 (and not yet transmitted to the first client device 100, for example). The second quality issue associated with the fourth video stream chunk may be detected by determining that the available video level is less than or equal to the threshold available video level and/or that the fourth video stream chunk is not received. In some examples, the fourth video stream chunk associated with the second quality issue may be identified based upon the one or more available video stream chunks and/or the manifest 122. For example, the fourth video stream chunk may be identified based upon a determination that the fourth video stream chunk follows (e.g., directly follows) the one or more available video stream chunks in the arrangement of video stream chunks indicated by the manifest 122.

In some examples, the threshold buffer level and/or the threshold available video level may be configured such that one or more corrective actions can be performed and/or the fourth video stream chunk can be delivered to the first client device 100 prior to the buffer being depleted, so as to provide for smooth playback without causing a pause due to delay in delivering the fourth video stream chunk to the first client device 100.

In response to detecting the first quality issue associated with the fourth video stream chunk (such as based upon not receiving the fourth video stream chunk by the first time and/or based upon not the buffer level being less than or equal to the threshold buffer level and/or based upon the available video level being less than or equal to the threshold available video level), one or more corrective actions may be performed (by the client-side router 106, for example). The one or more corrective actions may comprise transmitting the request 132 for the corrective chunk 136, receiving the corrective chunk 136 and/or transmitting the corrective chunk 136 to the first client device 100. In an example where the first quality issue is associated with the fourth video stream chunk, the corrective chunk 136 may correspond to the fourth video stream chunk. In some examples, the request 132 may comprise a video stream chunk identifier of the fourth video stream chunk (e.g., the corrective chunk 136) and/or may indicate that the fourth video stream chunk associated with the video stream chunk identifier is requested. The video stream chunk identifier of the fourth video stream chunk may be determined based upon the manifest 122.

In some examples, a first alarm message 134 associated with the first quality issue may be transmitted to a quality issue system 144. For example, the client-side router 106 may transmit the first alarm message 134 to the quality issue system 144 in response to detecting the first quality issue (associated with the second chunk 128 or the fourth video stream chunk, for example). The first alarm message 134 may be generated based upon the first quality issue and/or a video stream chunk (e.g., the second chunk 128 or the fourth video stream chunk) associated with the first quality issue.

In some examples, the first alarm message 134 may comprise metadata (e.g., stream metadata) associated with presentation of the video stream via the first client device 100 and/or the first quality issue. In some examples, the first alarm message 134 may be indicative of alarm information associated with the first quality issue. For example, the alarm information may comprise a type of quality issue of the first quality issue (e.g., the type of quality issue may correspond to at least one of corruption of a video stream chunk, a video stream chunk missing data, a video stream chunk having one or more incorrect parameters, a video stream chunk not being received prior to another video stream chunk that follows the video stream chunk in the arrangement indicated by the manifest 122, a video stream chunk not being received by a time, a video stream chunk not being received and a buffer level being less than or equal to the threshold buffer level, a video stream chunk not being received and an available video level being less than or equal to the threshold available video level, etc.). Alternatively and/or additionally, the alarm information may comprise a video stream chunk identifier of a video stream chunk associated with the first quality issue (e.g., the second chunk 128 or the fourth video stream chunk). Alternatively and/or additionally, the alarm information may comprise a video stream identifier of the video stream (e.g., the video stream may be identified based upon the video stream identifier). Alternatively and/or additionally, the alarm information may comprise a type of video stream of the video stream (e.g., the type of video stream may correspond to at least one of a TV channel, a live channel, a VOD video, a pre-recorded video, a livestream video, a movie, a TV show, a sports video, a news-related video, a news channel video clip, an internet news video clip, an educational video, a how-to video, an educational video clip, a documentary, an entertainment video, a sports-related video clip, an informational video, an interview-related video, a video clip of a meeting, an advertisement, etc.). Alternatively and/or additionally, the alarm information may comprise an identification of the first cache node 112 and/or the second cache node 112 (e.g., the alarm information may comprise at least one of one or more cache node identifiers, one or more cache node addresses, etc. of the first cache node 112 and/or the second cache node 112). Alternatively and/or additionally, the alarm information may comprise an identification of the client-side router 106 and/or the first client device 100 (e.g., the alarm information may comprise at least one of one or more device identifiers, one or more device addresses, one or more network addresses, etc. of the client-side router 106 and/or the first client device 100).

In some examples, one or more first problems and/or one or more first solutions associated with the first quality issue may be determined (and/or predicted) by the client-side router 106. In some examples, the first alarm message 134 may be indicative of the one or more first problems and/or the one or more first solutions. In some examples, the one or more first problems and/or the one or more first solutions may be determined based upon the first quality issue (e.g., the type of quality issue of the first quality issue), one or more second quality issues detected by the client-side router 106 (e.g., the one or more second quality issues may be associated with one or more video stream chunks and/or other content received from one or more cache nodes of the cache system 104), etc.

In an example, a first problem of the one or more first problems may correspond to the first cache node 112 having incomplete or corrupted data of the video stream. The client-side router 106 may determine (and/or predict) the first problem based upon a determination that the first quality issue corresponds to corruption of a video stream chunk, a video stream chunk missing data and/or a video stream chunk having one or more incorrect parameters. A first solution (of the one or more first solutions) to the first problem may correspond to discarding (e.g., flushing and/or deleting) a set of data stored on the first cache node 112, and/or storing a replacement for the set of data on the first cache node 112. In some examples, the set of data may correspond to the video stream. Alternatively and/or additionally, the set of data may correspond to one or more video stream chunks, of the video stream, associated with one or more detected quality issues (e.g., merely video stream chunks on the first cache node 112 that are associated with quality issues may be discarded and/or replaced with replacement video stream chunks).

In an example, a second problem of the one or more first problems may correspond to a video stream chunk not being stored on and/or not being available to the first cache node 112. The client-side router 106 may determine (and/or predict) the second problem based upon a determination that the first quality issue corresponds to a video stream chunk not being received prior to another video stream chunk that follows the video stream chunk in the arrangement indicated by the manifest 122. A second solution (of the one or more first solutions) to the second problem may correspond to storing the video stream chunk on the first cache node 112.

In an example, a third problem of the one or more first problems may correspond to a system problem (e.g., at least one of a connection problem, a data delivery problem, network traffic congestion, a communication problem, latency of data transmission exceeding a threshold latency, transmission speed of data transmission being less than a threshold transmission speed, etc.) associated with the client-side router 106, the first cache node 112 and/or one or more other computers associated with delivery of data (e.g., at least one of content, instructions, etc.) to the client-side router 106 and/or the first cache node 112. The client-side router 106 may determine (and/or predict) the third problem based upon a determination that the first quality issue corresponds to a video stream chunk not being received by a time. Alternatively and/or additionally, client-side router 106 may determine (and/or predict) the third problem based upon a determination that the first quality issue corresponds to a video stream chunk not being received and a buffer level being less than or equal to the threshold buffer level. Alternatively and/or additionally, client-side router 106 may determine (and/or predict) the third problem based upon a determination that the first quality issue corresponds to a video stream chunk not being received and an available video level associated with presentation of the video stream being less than or equal to the threshold available video level. A third solution (of the one or more first solutions) to the third problem may correspond to at least one of increasing bandwidth associated with communication between the client-side router 106 and the first cache node 112, assigning a different cache node of the cache system 104 to provide content to the client-side router 106, reassigning one or more devices (e.g., routers) being served by the first cache node 112 to be served by one or more different cache nodes of the cache system 104, modifying one or more settings associated with the client-side router 106 and/or the first cache node 112 (and/or one or more other computers associated with delivery of data to the client-side router 106 and/or the first cache node 112), modifying one or more settings associated with a connection of the client-side router 106 with the first cache node 112, etc.

In some examples, in response to receiving the alarm message 134, the quality issue system 144 may analyze the alarm message 134 to determine one or more second problems and/or one or more second solutions associated with the first quality issue. In some examples, the one or more second problems and/or the one or more second solutions may be determined based upon the one or more first problems and/or the one or more first solutions indicated by the first alarm message 134. Alternatively and/or additionally, the one or more second problems and/or the one or more second solutions may be determined based upon the alarm information, indicated by the first alarm message 134, associated with the first quality issue.

In some examples, the quality issue system 144 may perform one or more operations based upon the one or more second problems, the one or more second solutions and/or the alarm information indicated by the first alarm message 134.

In an example, the quality issue system 144 may access and/or analyze data (e.g., data corresponding to the video stream and/or other content) stored on the first cache node 112 to determine whether the data is corrupted, the data is incomplete, the data comprises incorrect parameters, etc. In response to determining that the data at least one of is corrupted, is incomplete, comprises incorrect parameters, etc., the quality issue system 144 may transmit one or more instructions to the first cache node 112 to discard the data, and/or the quality issue system 144 may transmit replacement data to the first cache node 112 for storage on the first cache node 112. For example, in response to receiving the one or more instructions and/or the replacement data, the first cache node 112 may discard the data and/or the first cache node 112 may store the replacement data.

In an example, the quality issue system 144 may access and/or analyze a video stream chunk, associated with the first quality issue, that is stored on the first cache node 112 to determine whether the video stream chunk is corrupted, the video stream chunk is incomplete, the video stream chunk comprises incorrect parameters, etc. In response to determining that the video stream chunk at least one of is corrupted, is incomplete, comprises incorrect parameters, etc., the quality issue system 144 may transmit one or more instructions to the first cache node 112 to discard the video stream chunk, and/or the quality issue system 144 may transmit a replacement for the video stream chunk to the first cache node 112 for storage on the first cache node 112. For example, in response to receiving the one or more instructions and/or the replacement for the video stream chunk, the first cache node 112 may discard the video stream chunk and/or the first cache node 112 may store the replacement for the video stream chunk.

In an example, the quality issue system 144 may access and/or analyze data (e.g., data corresponding to the video stream and/or other content) stored on the first cache node 112 to determine whether the data is missing a video stream chunk, associated with the quality issue, of the video stream. In response to determining that the video stream chunk is missing from the data, the quality issue system 144 may transmit the video stream chunk to the first cache node 112 for storage on the first cache node 112. For example, in response to receiving the video stream chunk, the first cache node 112 may store the video stream chunk.

In an example, the quality issue system 144 may monitor and/or analyze at least one of one or more settings, activity, communications, etc. of at least one of the first cache node 112, the client-side router 106, one or more computers, a connection of the first cache node 112 with the client-side router 106, etc. to check for a system problem (e.g., at least one of a connection problem, a data delivery problem, network traffic congestion, a communication problem, latency of data transmission exceeding a threshold latency, transmission speed of data transmission being less than a threshold transmission speed, etc.) associated with the client-side router 106, the first cache node 112 and/or one or more other computers associated with delivery of data to the client-side router 106 and/or the first cache node 112. In response to detecting a system problem, the quality issue system 144 may perform one or more operations, such as at least one of increase bandwidth associated with communication between the client-side router 106 and the first cache node 112, assign a different cache node of the cache system 104 to provide content to the client-side router 106, reassign one or more devices (e.g., routers) being served by the first cache node 112 to be served by one or more different cache nodes of the cache system 104, modify one or more settings associated with the client-side router 106 and/or the first cache node 112 (and/or one or more other computers associated with delivery of data to the client-side router 106 and/or the first cache node 112), modify one or more settings associated with a connection of the client-side router 106 with the first cache node 112, etc.

In some examples, the quality issue system 144 may transmit one or more notifications to one or more first devices based upon the first alarm message 134. In an example, the one or more first devices may be associated with one or more system administrators and/or one or more individuals in charge of handling detected quality issues. The one or more notifications may be indicative of at least one of the one or more second problems, the one or more second solutions, at least some of the alarm information of the first alarm message 134, etc.

In some examples, the quality issue system 144 may display information associated with the first alarm message 134. The displayed information may comprise at least one of the one or more second problems, the one or more second solutions, at least some of the alarm information of the first alarm message 134, etc. In some examples, the displayed information may identify one or more computers (e.g., the client-side router 106, the first cache node 112 and/or one or more other computers) associated with the first quality issue, one or more locations associated with the first quality issue (e.g., a location of the client-side router 106, a location of the first cache node 112, one or more locations of one or more other computers associated with the first quality issue and/or one or more locations of one or more connections associated with the first quality issue), etc. In some examples, at least some of the displayed information may be displayed via a dashboard (e.g., a Network Operations Center (NOC) dashboard of a NOC system 118 and/or a Customer Premise Equipment (CPE) manager dashboard of a CPE manager system 116). In an example, the first alarm message 134 may be received by the CPE manager system 116 of the quality issue system 144. The first alarm message 134 may be transmitted (e.g., forwarded), by the CPE manager system 116, to the NOC system 118. Alternatively and/or additionally, the CPE manager system 116 may generate a second alarm message (e.g., a message that is compatible with the NOC system 118) based upon the first alarm message 134, and transmit the second alarm message to the NOC system 118. The displayed information may be displayed via the NOC dashboard, of the NOC system 118, based upon the second alarm message and/or the first alarm message 134.

In some examples, the client-side router 106 (and/or other client-side-routers) may be provided with one or more instructions, one or more computing programs and/or data to enable the client-side router 106 (and/or the other client-side routers) to perform operations in accordance with techniques described herein. For example, the one or more instructions, the one or more computing programs and/or the data may be transmitted to the client-side router 106 and/or installed on the client-side router 106 (via a software update, for example).

In some examples, the client-side router 106 may perform communications with the first client device 100 over a local area network (e.g., a wireless local area network and/or wired local area network, such as utilizing at least one of Ethernet, WiFi, or other technology). For example, the client-side router 106 may transmit the first chunk 126 and/or the corrective chunk 136 to the first client device 100 via the local area network. Alternatively and/or additionally, the client-side router 106 may perform communications with the cache system 104 and/or the quality issue system 144 via a wide area network (e.g., a wide area network associated with at least one of a packet-switched network, an Internet Protocol (IP) network, the Internet, etc.). For example, reception of the manifest 122, the first chunk 126, the second chunk 128 and/or the corrective chunk 136, may each be performed over a wide area network. Transmission of the request 132 for the corrective chunk 136 and/or the first alarm message 134 may each be performed over a wide area network. In some examples, the client-side router 106 may be (and/or may function as) an edge node of a network (e.g., a wide area network) and/or an internet service provider utilized for providing data (e.g., content of the content system 102) to one or more client devices (e.g., the first client device 100) communicatively coupled to the client-side router 106. In some examples, the client-side router 106 may be communicatively coupled to one or more computers (e.g., one or more cache nodes of the cache system 104 and/or one or more computers of the quality issue system 144), associated with delivering data to the one or more client devices, via one or more types of communication media, such as at least one of wireless (e.g., a communication medium utilizing one or more cellular network technologies (e.g., second-generation cellular technology (2G), third-generation cellular technology (3G), fourth-generation cellular technology (4G), fifth-generation cellular technology (5G) and/or one or more future generation cellular technologies and/or other types of wireless communication media), cable, optical fiber, radio, etc.

In some examples, one or more of the techniques described herein may be performed within a mobile edge computing network architecture and/or a multi-access edge computing (MEC) network architecture. In an example, one or more functionalities, data and/or one or more computing programs of the cache system 104 may be deployed (as a virtual machine, for example) at a MEC device (e.g., a network node, such as a cellular base station and/or a different edge node). For example, the first cache node 112 and/or the second cache node 114 may be implemented by one or more MEC devices. Alternatively and/or additionally, one or more functionalities, data and/or one or more computing programs of the client-side router 106 may be deployed (as a virtual machine, for example) at a MEC device (e.g., a network node, such as a cellular base station and/or a different edge node). For example, the client-side router 106 may be implemented by the MEC device.

In some examples, the first client device 100 may have one or more functionalities, one or more computing programs and/or data of the client-side router 106. Alternatively and/or additionally, the client-side router 106 may be implemented by the first client device 100. Alternatively and/or additionally, some and/or all operations performed by the client-side router 106 as provided herein may be performed by the first client device 100, in accordance with some embodiments.

Figure 5:
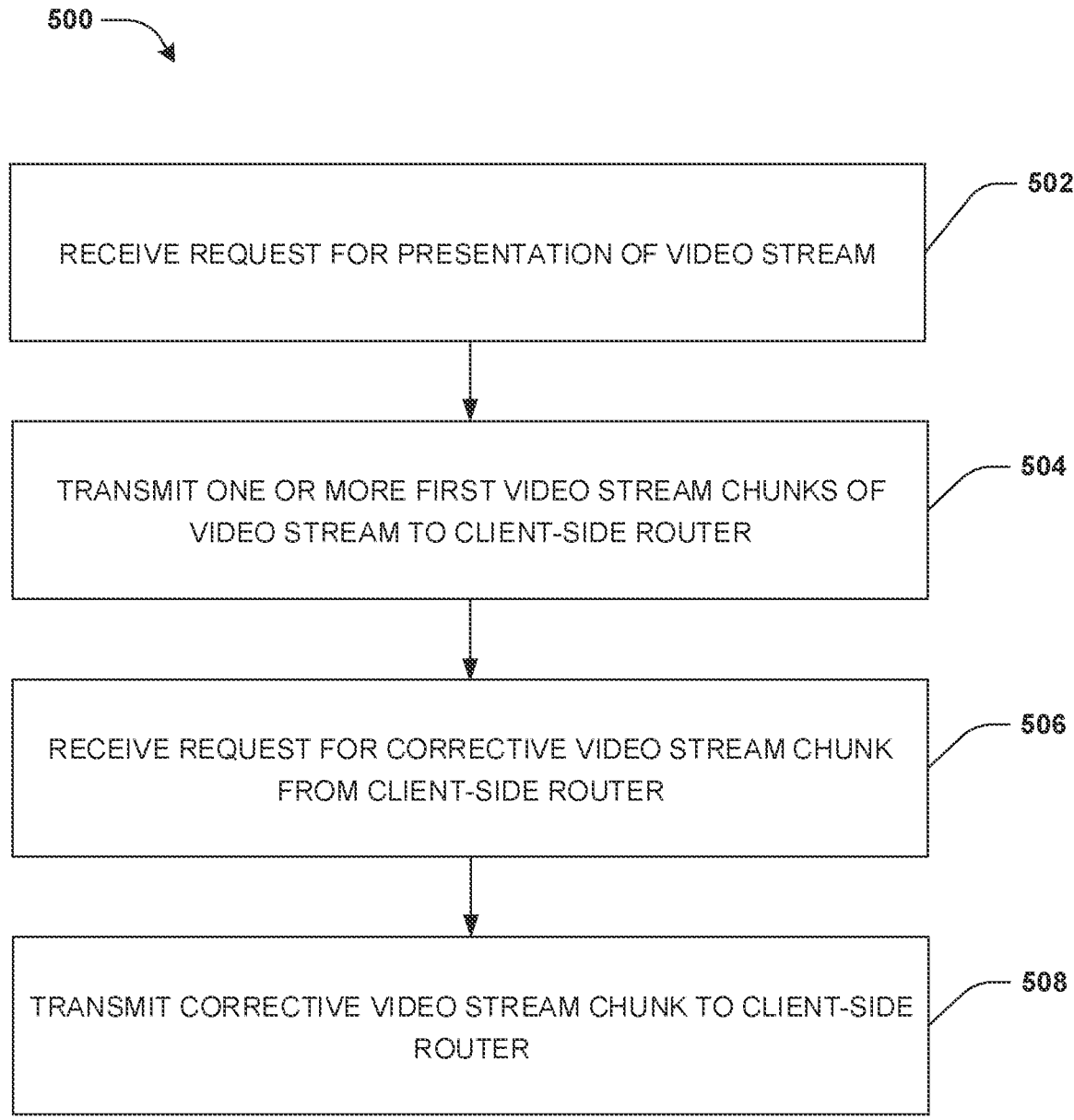
FIG. 5 is a flow chart illustrating an example method for delivering video streams.

An embodiment of delivering video streams is illustrated by an exemplary method 500 of FIG. 5, and is further described in conjunction with FIG. 1B. At 502 of FIG. 5, a request 120 for presentation of a video stream may be received, such as illustrated in FIG. 1B. The request 120 may be received by a cache system 104 from a first client device 100 (and/or a client-side router 106). In an example, the request 120 may be received by a first cache node 112 (e.g., a primary cache node) of the cache system 104. At 504 of FIG. 5, one or more first video stream chunks of the video stream may be transmitted to the client-side router 106 for presentation via the first client device 100, such as illustrated in FIG. 1B. The one or more first video stream chunks may comprise a first chunk 126 and/or a second chunk 128. The one or more first video stream chunks may be transmitted to the client-side router 106 by the cache system 104. In an example, the one or more first video stream chunks may be transmitted to the client-side router 106 by the first cache node 112 of the cache system 104. At 506 of FIG. 5, a request 132 for a corrective chunk 136 may be received from the client-side router 106, such as illustrated in FIG. 1B. In some examples, the request 132 for the corrective chunk 136 is indicative of a first quality issue associated with a third video stream chunk of the video stream. The request 132 for the corrective chunk 136 may be received by the cache system 104. In an example, the request 132 for the corrective chunk 136 may be received by a second cache node 114 (e.g., a backup cache node) of the cache system 104. At 508 of FIG. 5, the corrective chunk 136 may be transmitted to the client-side router 106 for presentation via the first client device 100, such as illustrated in FIG. 1B. The corrective chunk 136 may be transmitted to the client-side router 106 by the cache system 104. In an example, the corrective chunk 136 may be transmitted to the client-side router 106 by the second cache node 114 of the cache system 104.

In some examples, the corrective chunk 136 may be a replacement for the third video stream chunk. The one or more first video stream chunks transmitted to the client-side router 106 may comprise the third video stream chunk. The first quality issue may correspond to corruption of the third video stream chunk, the third video stream chunk missing data (e.g., video data) and/or the third video stream chunk having one or more incorrect parameters.

In some examples, a replacement for the third video stream chunk may be stored on the first cache node 112. For example, the replacement for the third video stream chunk may be received by the first cache node 112 from a quality issue system 144.

Implementation of at least some of the disclosed subject matter may lead to benefits including, but not limited to, more effectively detecting quality issues associated with video stream chunks and reducing an amount of video stream chunks, associated with quality issues (e.g., at least one of corruption, missing data, incorrect parameters, etc.), that are received by and/or are presented by the first client device 100. For example, utilizing the client-side router 106 to monitor and/or analyze video stream chunks and/or statuses associated with video stream chunks to check for quality issues may increase a likelihood that a quality issue is detected and/or may reduce a likelihood that a video stream chunk with a quality issue is received and/or presented by the first client device 100, as compared to utilizing other computers, that are further away from the first client device 100 than the client-side router 106, to check for quality issues (e.g., as a result of the closer proximity of the client-side router 106 to the first client device 100, it is more likely that a quality issue associated with a video stream arises prior to reception of the video stream by the client-side router 106, and less likely that a quality issue associated with a video stream arises after reception of the video stream by the client-side router 106).

According to some embodiments, a method is provided. The method includes receiving, from a first cache node, a first video stream chunk of a video stream for presentation via a first client device; analyzing the first video stream chunk to determine whether the first video stream chunk is associated with one or more quality issues; in response to determining that the first video stream chunk is not associated with a quality issue, transmitting the first video stream chunk to the first client device; receiving, from the first cache node, a second video stream chunk of the video stream; analyzing the second video stream chunk to determine whether the second video stream chunk is associated with one or more quality issues; in response to detecting a first quality issue associated with the second video stream chunk, transmitting a request, for a corrective video stream chunk, to a second cache node based upon the first quality issue; receiving, from the second cache node, the corrective video stream chunk; and in response to receiving the corrective video stream chunk from the second cache node, transmitting the corrective video stream chunk to the first client device.

According to some embodiments, the method includes transmitting the first video stream chunk to the first client device and transmitting the corrective video stream chunk to the first client device over a local area network; and receiving the first video stream chunk from the first cache node, receiving the second video stream chunk from the first cache node, and receiving the corrective video stream chunk from the second cache node over a wide area network.

According to some embodiments, the method includes transmitting, to a quality issue system, a first alarm message based upon the first quality issue, wherein the first alarm message is indicative of the first quality issue.

According to some embodiments, the corrective video stream chunk is a replacement for the second video stream chunk.

According to some embodiments, the first quality issue corresponds to corruption of the second video stream chunk, the second video stream chunk missing data and/or the second video stream chunk having one or more incorrect parameters.

According to some embodiments, the method includes receiving a manifest of the video stream; determining an arrangement of video stream chunks of the video stream based upon the manifest; and determining that the corrective video stream chunk is before the second video stream chunk in the arrangement, wherein the first quality issue corresponds to the corrective video stream chunk not being received prior to receiving the second video stream chunk.

According to some embodiments, the first cache node is the same as the second cache node.

According to some embodiments, the first cache node is different than the second cache node; and the first cache node is a primary cache node and/or the second cache node is a backup cache node.

According to some embodiments, a non-transitory computer-readable medium, storing instructions that when executed perform operations, is provided. The operations include receiving a manifest of a video stream for presentation via a first client device; receiving, from a first cache node, one or more first video stream chunks of the video stream; analyzing the one or more first video stream chunks of the video stream; analyzing, based upon the manifest, one or more first statuses of one or more second video stream chunks of the video stream, wherein analyzing the one or more first video stream chunks and/or analyzing the one or more first statuses include determining that a first video stream chunk of the video stream is not associated with a quality issue and detecting a first quality issue associated with a second video stream chunk of the video stream; presenting the first video stream chunk via the first client device based upon determining that the first video stream chunk is not associated with a quality issue; transmitting a request, for a corrective video stream chunk, to a second cache node based upon the first quality issue; receiving, from the second cache node, the corrective video stream chunk; and in response to receiving the corrective video stream chunk from the second cache node, presenting the corrective video stream chunk via the first client device.

According to some embodiments, the operations include transmitting, to a quality issue system, a first alarm message based upon the first quality issue, wherein the first alarm message is indicative of the first quality issue.

According to some embodiments, the corrective video stream chunk is a replacement for the second video stream chunk.

According to some embodiments, the first quality issue corresponds to corruption of the second video stream chunk, the second video stream chunk missing data and/or the second video stream chunk having one or more incorrect parameters.

According to some embodiments, the one or more second video stream chunks comprise the second video stream chunk; a first status of the one or more first statuses corresponds to whether the second video stream chunk is received from the first cache node; the first quality issue corresponds to not receiving the second video stream chunk, from the first cache node, by a first time; and the corrective video stream chunk comprises the second video stream chunk.

According to some embodiments, the first time is based upon a second time at which the client device is expected to present the second video stream chunk.

According to some embodiments, the one or more second video stream chunks comprise the second video stream chunk; a first status of the one or more first statuses corresponds to whether the second video stream chunk is received from the first cache node; the first quality issue corresponds to not receiving the second video stream chunk from the first cache node and a buffer level, associated with presentation of the video stream via the first client device, being less than or equal to a threshold buffer level; and the corrective video stream chunk comprises the second video stream chunk.

According to some embodiments, the operations include determining an arrangement of video stream chunks of the video stream based upon the manifest; and determining that the corrective video stream chunk is before the second video stream chunk in the arrangement, wherein the first quality issue corresponds to the corrective video stream chunk not being received prior to receiving the second video stream chunk.

According to some embodiments, a system is provided. The system comprises a processor coupled to memory, the processor configured to execute instructions to perform operations. The operations include receiving, from a first client device, a request for presentation of a video stream; transmitting, to a client-side router associated with the first client device, one or more first video stream chunks, of the video stream, for presentation via the first client device; receiving, from the client-side router, a request for a corrective video stream chunk, wherein the request for the corrective video stream chunk is indicative of a first quality issue associated with a first video stream chunk of the video stream; and transmitting, to the client-side router, the corrective video stream chunk for presentation via the first client device.

According to some embodiments, the operations include receiving the request for presentation of the video stream and transmitting the one or more first video stream chunks via a primary cache node; and receiving the request for the corrective video stream chunk and transmitting the corrective video stream chunk via a backup cache node.

According to some embodiments, the corrective video stream chunk is a replacement for the first video stream chunk.

According to some embodiments, the first quality issue corresponds to corruption of the first video stream chunk, the first video stream chunk missing data and/or the first video stream chunk having one or more incorrect parameters; and the operations include storing, on the primary cache node, a second replacement for the first video stream chunk.

Figure 6:
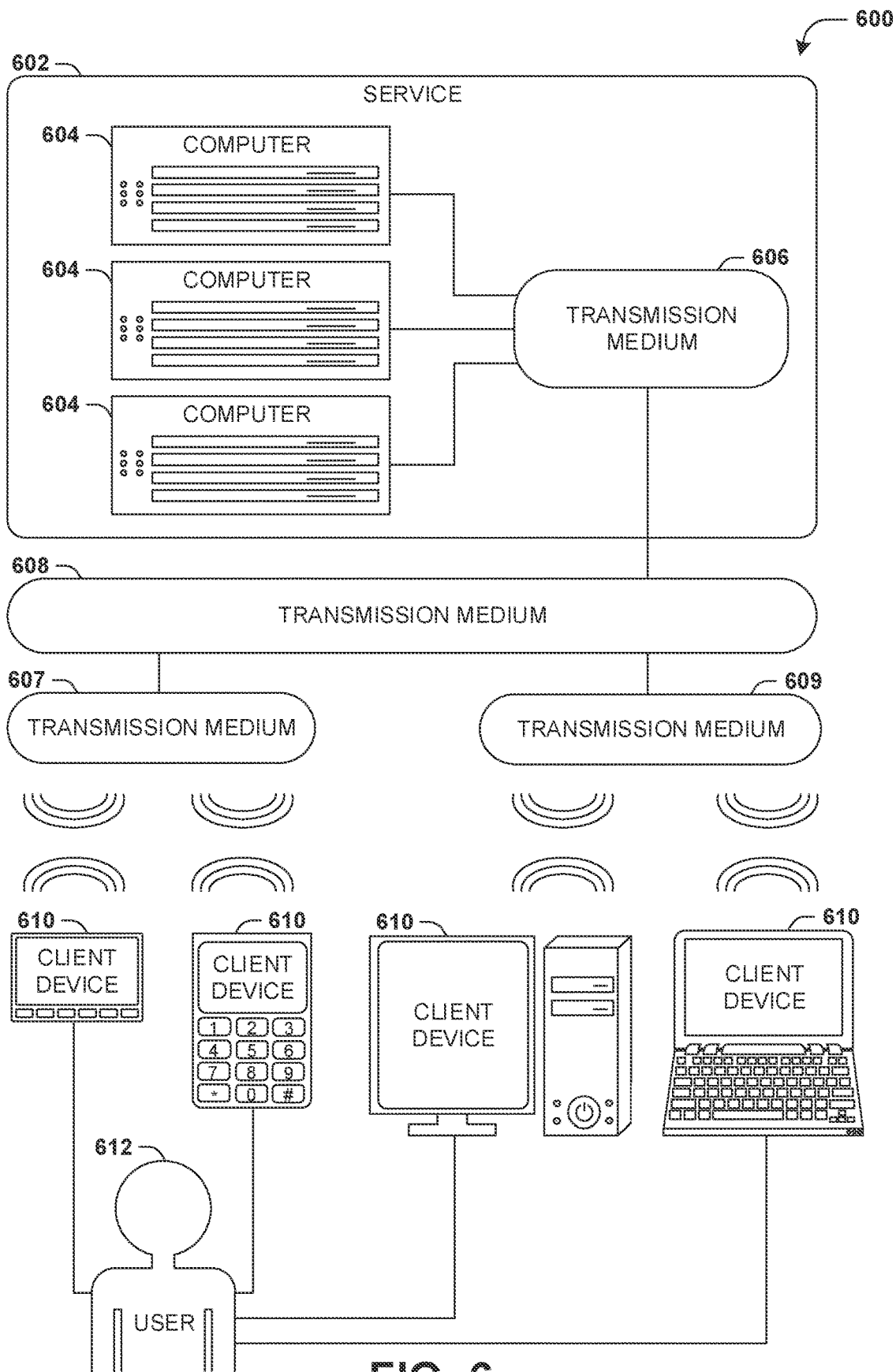
FIG. 6 is an illustration of a scenario involving various examples of transmission mediums that may be used to communicatively couple computers and clients.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 607 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 604 and the client devices 610 may communicate over various types of transmission mediums.

Figure 7:
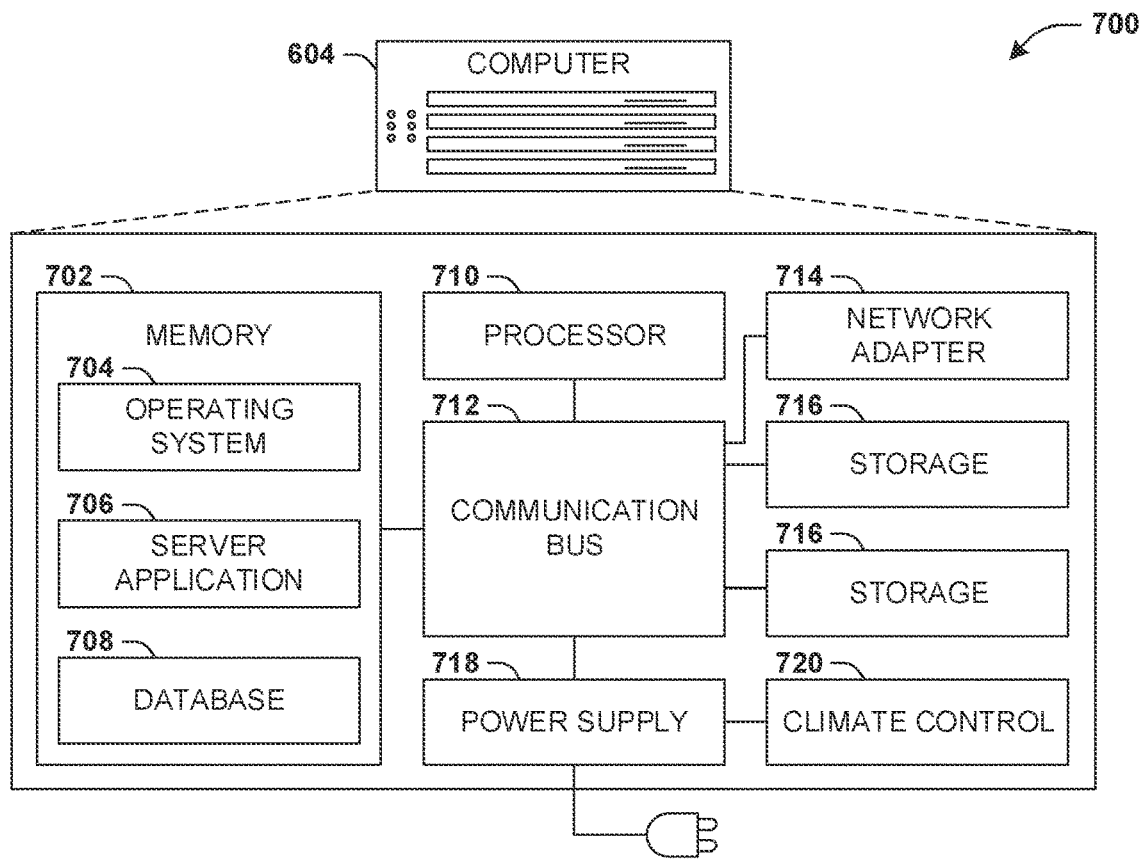
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figure 8:
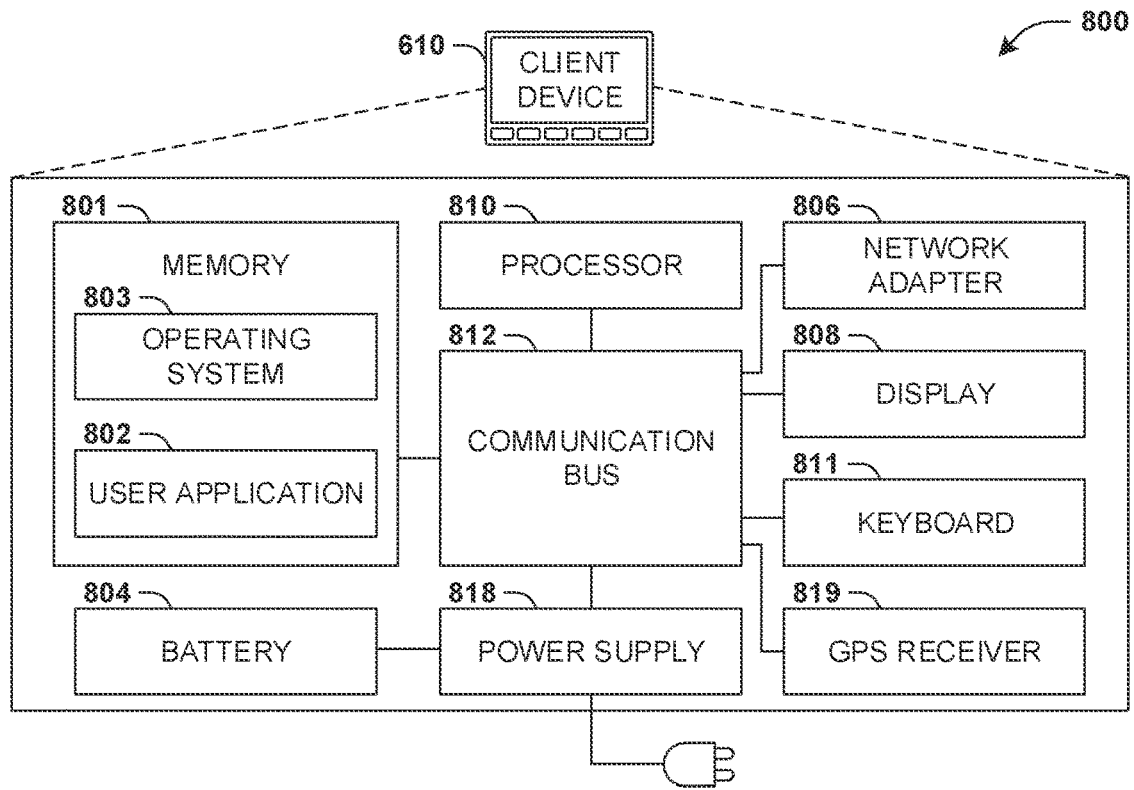
FIG. 8 is an illustration of a scenario involving an example configuration of a client that may utilize and/or implement at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
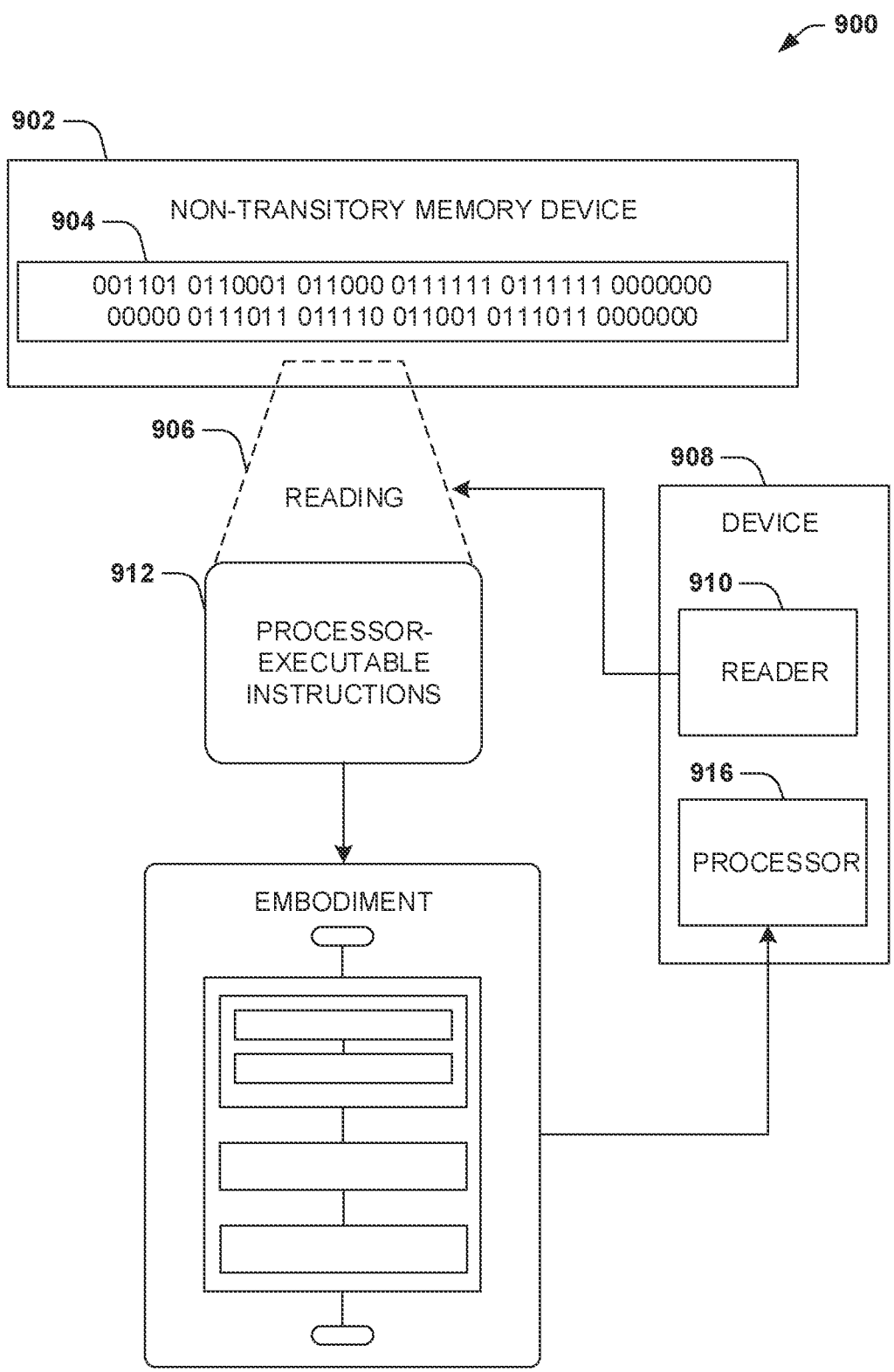
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2, and/or the example method 500 of FIG. 5, for example. In some embodiments, the processor-executable instructions 912 are configured to cause implementation of a system, such as at least some of the example system 101 of FIGS. 1A-1D, for example.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1003, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as client-side router 1051.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively and/or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1003 may include a computation and communication device, such as a wireless mobile communication device that is capable of communicating with RAN 1010, RAN 1012, and/or DN 1050. UE 1003 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1003 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1003 may communicate with one or more other elements of environment 1000. UE 1003 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, AMF 1015, and/or one or more other devices or networks) and may communicate the traffic to UE 1003 via the air interface.

RAN 1012 may be, or may include, a LTE RAN that includes one or more base stations (e.g., one or more eNBs 1013), via which UE 1003 may communicate with one or more other elements of environment 1000. UE 1003 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, SGW 1017, and/or one or more other devices or networks) and may communicate the traffic to UE 1003 via the air interface.

AMF 1015 may include one or more devices, systems, Virtualized Network Functions ("VNFs"), etc., that perform operations to register UE 1003 with the 5G network, to establish bearer channels associated with a session with UE 1003, to hand off UE 1003 from the 5G network to another network, to hand off UE 1003 from the other network to the 5G network, manage mobility of UE 1003 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1003 with the EPC, to establish bearer channels associated with a session with UE 1003, to hand off UE 1003 from the EPC to another network, to hand off UE 1003 from another network to the EPC, manage mobility of UE 1003 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1003. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1003, from DN 1050, and may forward the user plane data toward UE 1003 (e.g., via RAN 1010, SMF/PGW-C 1020, and/or one or more other devices). In some embodiments, multiple UPFs 1035 may be deployed (e.g., in different geographical locations), and the delivery of content to UE 1003 may be coordinated via the N9 interface (e.g., as denoted in FIG. 10 by the line marked "N9" originating and terminating at UPF/PGW-U 1035). Similarly, UPF/PGW-U 1035 may receive traffic from UE 1003 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1003.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1003 may communicate, through DN 1050, with data servers, other UEs UE 1003, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1003 may communicate.

The client-side router 1051 may include one or more devices, systems, VNFs, etc., that perform one or more operations described herein. For example, the client-side router 1051 may monitor and/or analyze video stream chunks and/or statuses associated with video stream chunks to check for quality issues and/or may deliver video stream chunks to UE 1003.

Figure 11:
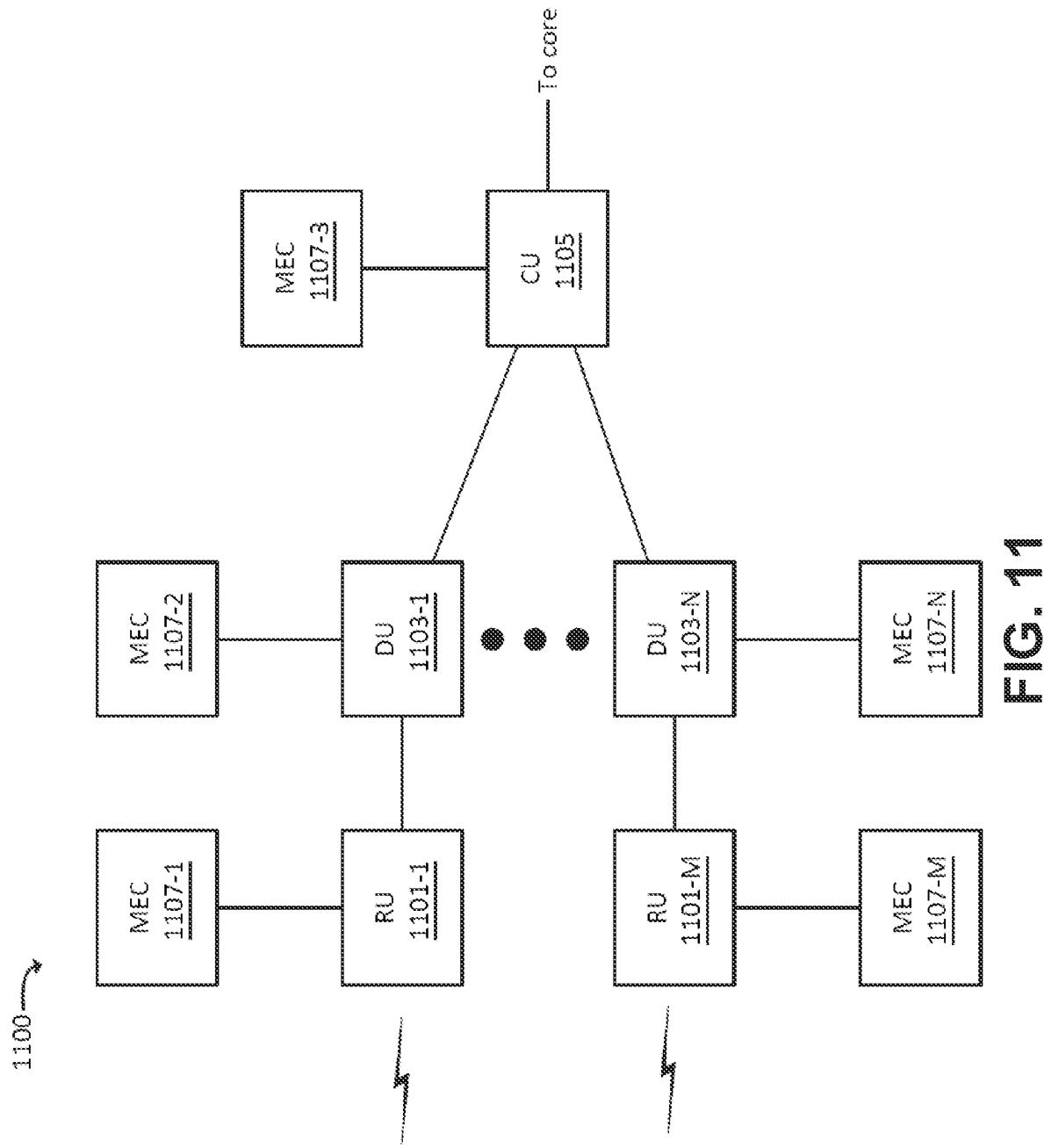
FIG. 11 is an illustration of an example network that may utilize and/or implement at least a portion of the techniques presented herein.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs UE 1003 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1003, and may determine which DU(s) 1103 should receive the downlink traffic. DU 1103 may include one or more devices that transmit traffic between a core network (e.g., via CU 1105) and UE 1003 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1003.

RU 1101 may include hardware circuitry (e.g., one or more RF transceivers, antennas, radios, and/or other suitable hardware) to communicate wirelessly (e.g., via an RF interface) with one or more UEs UE 1003, one or more other DUs 1103 (e.g., via RUs 1101 associated with DUs 1103), and/or any other suitable type of device. In the uplink direction, RU 1101 may receive traffic from UE 1003 and/or another DU 1103 via the RF interface and may provide the traffic to DU 1103. In the downlink direction, RU 1101 may receive traffic from DU 1103, and may provide the traffic to UE 1003 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1003, via a respective RU 1101.

For example, RU 1101-1 may route some traffic, from UE 1003, to MEC 1107-1 instead of to a core network (e.g., via DU 1103 and CU 1105). MEC 1107-1 may process the traffic, perform one or more computations based on the received traffic, and may provide traffic to UE 1003 via RU 1101-1. In this manner, ultra-low latency services may be provided to UE 1003, as traffic does not need to traverse DU 1103, CU 1105, and an intervening backhaul network between DU network 1100 and the core network. In some embodiments, MEC 1107 may include, and/or may implement some or all of the functionality described above with respect to the client-side router 1051, the client-side router 106 and/or at least one cache node of the cache system 104 (such as the first cache node 112 and/or the second cache node 114).

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of using a client-side router to facilitate delivery of video content to a first client device, the method comprising:
   receiving, by the client-side router and from a first cache node, a first video stream chunk of a video stream for presentation via the first client device;
   analyzing, by the client-side router, the first video stream chunk to determine whether the first video stream chunk is associated with one or more quality issues;
   responsive to determining, by the client-side router, that the first video stream chunk is not associated with a quality issue, transmitting, by the client-side router, the first video stream chunk to the first client device;
   receiving, by the client-side router and from the first cache node, a second video stream chunk of the video stream;
   analyzing, by the client-side router, the second video stream chunk and a manifest of the video stream to determine whether the second video stream chunk is associated with one or more quality issues corresponding to the second video stream chunk having one or more incorrect parameters that are incompatible with the first client device on which the video stream is being presented;
   responsive to detecting, by the client-side router, a first quality issue corresponding to the second video stream chunk having the one or more incorrect parameters that are incompatible with the first client device based upon the analysis of the manifest, transmitting, by the client-side router, a request, for a corrective video stream chunk that is compatible with the first client device, to a second cache node based upon the first quality issue;
   receiving, by the client-side router and from the second cache node, the corrective video stream chunk; and
   responsive to receiving, by the client-side router, the corrective video stream chunk from the second cache node, transmitting, by the client-side router, the corrective video stream chunk to the first client device.

2. The method of claim 1, further comprising:
   transmitting the first video stream chunk to the first client device and transmitting the corrective video stream chunk to the first client device over a local area network; and
   receiving the first video stream chunk from the first cache node, receiving the second video stream chunk from the first cache node, and receiving the corrective video stream chunk from the second cache node over a wide area network.

3. The method of claim 1, further comprising:
   transmitting, to a quality issue system, a first alarm message based upon the first quality issue, wherein the first alarm message is indicative of the first quality issue.

4. The method of claim 1, wherein:
   the client-side router is closest to the first client device among components, in a delivery path, controlled by a service to deliver the video stream.

5. The method of claim 1, further comprising:
   receiving, from the first cache node, a third video stream chunk of the video stream;
   analyzing the third video stream chunk to determine whether the third video stream chunk is associated with one or more quality issues corresponding to the third video stream chunk having one or more second incorrect parameters that at least one of are less than a first threshold or exceed a second threshold; and
   responsive to detecting a second quality issue corresponding to the third video stream chunk having the one or more second incorrect parameters that at least one of are less than the first threshold or exceed the second threshold, transmitting a second request, for a second corrective video stream chunk, to the second cache node based upon the second quality issue.

6. The method of claim 1, further comprising:
   receiving, from the first cache node, a third video stream chunk of the video stream;
   analyzing the third video stream chunk to determine whether the third video stream chunk is associated with one or more quality issues corresponding to the third video stream chunk having one or more second incorrect parameters that are different than video parameters of other video stream chunks of the video stream being presented on the first client device; and
   responsive to detecting a second quality issue corresponding to the third video stream chunk having the one or more second incorrect parameters that are different than the video parameters of the other video stream chunks, transmitting a second request, for a second corrective video stream chunk, to the second cache node based upon the second quality issue.

7. The method of claim 1, wherein:
   the first cache node is the same as the second cache node.

8. The method of claim 1, wherein:
   the first cache node is different than the second cache node; and
   at least one of:
      the first cache node is a primary cache node; or
      the second cache node is a backup cache node.

9. A non-transitory computer-readable medium storing instructions that when executed perform operations comprising:
   receiving a manifest of a video stream for presentation via a first client device;
   receiving, from a first cache node, one or more first video stream chunks of the video stream;
   analyzing the one or more first video stream chunks of the video stream;
   analyzing, based upon the manifest, one or more first statuses of one or more second video stream chunks of the video stream, wherein at least one of analyzing the one or more first video stream chunks or analyzing the one or more first statuses comprises:
      determining that a first video stream chunk of the video stream is not associated with a quality issue;
      determining, based upon the manifest, that an arrangement of the video stream provides for a corrective video stream chunk being before a second video stream chunk; and
      determining whether the corrective video stream chunk indicated by the manifest as being in the arrangement of the video stream before the second video stream chunk was not received prior to receiving the second video stream chunk indicated by the manifest as being in the arrangement of the video stream after the corrective video stream chunk;
   presenting the first video stream chunk via the first client device based upon determining that the first video stream chunk is not associated with a quality issue;
   transmitting a request, for the corrective video stream chunk indicated by the manifest as being in the arrangement of the video stream, to a second cache node based upon determining that the corrective video stream chunk indicated by the manifest as being in the arrangement of the video stream was not received prior to receiving the second video stream chunk indicated by the manifest as being in the arrangement of the video stream;

receiving, from the second cache node, the corrective video stream chunk; and responsive to receiving the corrective video stream chunk from the second cache node, presenting the corrective video stream chunk via the first client device.

10. The non-transitory computer-readable medium of claim 9, wherein the operations comprise:

transmitting, to a quality issue system, a first alarm message based upon a first quality issue.

11. The non-transitory computer-readable medium of claim 10, wherein the first quality issue is associated with the corrective video stream chunk not being received prior to receiving the second video stream chunk.

12. The non-transitory computer-readable medium of claim 9, wherein:

the operations comprise detecting a first quality issue associated with a third video stream chunk of the video stream; and the first quality issue corresponds to at least one of:
corruption of the third video stream chunk;
the third video stream chunk missing data; or
the third video stream chunk having one or more incorrect parameters.

13. The non-transitory computer-readable medium of claim 9, wherein:

a first status of the one or more first statuses corresponds to whether the corrective video stream chunk is received from the first cache node.

14. The non-transitory computer-readable medium of claim 9, wherein:

the first cache node is the same as the second cache node.

15. The non-transitory computer-readable medium of claim 9, wherein:

the operations comprise detecting a first quality issue associated with a third video stream chunk of the video stream; and the first quality issue corresponds to a buffer level, associated with presentation of the video stream via the first client device, being less than or equal to a threshold buffer level.

16. The non-transitory computer-readable medium of claim 9, wherein the first cache node is different than the second cache node.

17. A system comprising:

a processor coupled to memory, the processor configured to execute instructions to perform operations comprising:

receiving, from a first client device, a request for presentation of a video stream;

transmitting, to a client-side router associated with the first client device, one or more first video stream chunks, of the video stream, for presentation via the first client device;

receiving, from the client-side router, a request for a corrective video stream chunk, wherein the request for the corrective video stream chunk is indicative of a first quality issue corresponding to a first video stream chunk having one or more incorrect parameters that are different than video parameters of other video stream chunks of the video stream being presented to the first client device; and transmitting, to the client-side router, the corrective video stream chunk for presentation via the first client device.

18. The system of claim 17, the operations further comprising:

receiving the request for presentation of the video stream and transmitting the one or more first video stream chunks via a primary cache node; and receiving the request for the corrective video stream chunk and transmitting the corrective video stream chunk via a backup cache node.

19. The system of claim 17, the operations further comprising:

receiving, from the client-side router, a second request for a second corrective video stream chunk, wherein the second request for the second corrective video stream chunk is indicative of a second quality issue corresponding to a second video stream chunk having one or more second incorrect parameters that are incompatible with the first client device on which the video stream is being presented; and transmitting, to the client-side router, the second corrective video stream chunk for presentation via the first client device.

20. The system of claim 17, the operations further comprising:

receiving, from the client-side router, a second request for a second corrective video stream chunk, wherein the second request for the second corrective video stream chunk is indicative of a second quality issue corresponding to a second video stream chunk having one or more second incorrect parameters that at least one of are less than a first threshold or exceed a second threshold; and transmitting, to the client-side router, the second corrective video stream chunk for presentation via the first client device.

* * * * *